(12) United States Patent
Kato et al.

(10) Patent No.: US 6,854,721 B2
(45) Date of Patent: Feb. 15, 2005

(54) VIBRATION-DAMPING DEVICE

(75) Inventors: Rentaro Kato, Kasugai (JP); Hajime Maeno, Kasugai (JP); Koichi Hasegawa, Kasugai (JP); Koichi Maeda, Komaki (JP); Takahiro Aoi, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 112 days.

(21) Appl. No.: 10/076,781

(22) Filed: Feb. 13, 2002

(65) Prior Publication Data
US 2002/0113351 A1 Aug. 22, 2002

(30) Foreign Application Priority Data

| Feb. 19, 2001 | (JP) | 2001-042508 |
|---|---|---|
| Apr. 27, 2001 | (JP) | 2001-132860 |
| Jan. 23, 2002 | (JP) | 2002-014515 |

(51) Int. Cl.$^7$ .............................................. F16M 1/00
(52) U.S. Cl. ................................ 267/140.4; 188/380
(58) Field of Search ............................. 267/30, 140.4, 267/137, 138, 139, 140.11, 151, 152, 153, 140.3, 140.1; 188/378, 379, 380

(56) References Cited

U.S. PATENT DOCUMENTS

| 2,714,161 | A | | 7/1955 | Featherstun | |
|---|---|---|---|---|---|
| 3,612,222 | A | | 10/1971 | Minor | |
| 4,018,454 | A | | 4/1977 | Burkart | |
| 4,550,795 | A | * | 11/1985 | Teshima | 180/296 |
| 5,593,144 | A | | 1/1997 | Hamada et al. | |
| 5,669,555 | A | * | 9/1997 | Mosig | 237/12.3 C |
| 6,125,977 | A | * | 10/2000 | Nekomoto et al. | 188/378 |
| 6,315,094 | B1 | * | 11/2001 | Griffin et al. | 188/379 |
| 6,508,343 | B2 | * | 1/2003 | Misaji et al. | 188/379 |
| 6,554,112 | B2 | * | 4/2003 | Kato et al. | 188/379 |
| 2001/0032764 | A1 | | 10/2001 | Hasegawa et al. | |

FOREIGN PATENT DOCUMENTS

| DE | 2350656 | 10/1973 | |
|---|---|---|---|
| DE | 3410874 | 3/1984 | |
| DE | 19621271 | 5/1996 | |
| EP | 0838556 A1 | 4/1998 | ............. E04B/1/98 |
| JP | 57-52305 | 3/1982 | |
| JP | 62-66039 | 4/1987 | |
| JP | 64-42591 | 3/1989 | |
| JP | 3-86227 | 8/1991 | |
| JP | 4-46246 | 4/1992 | |
| JP | 9-329182 | 12/1997 | |
| WO | WO 00/14429 | 3/2000 | |

OTHER PUBLICATIONS

U.S. Appl. No. 09/796,079, filed Feb. 27, 2001.
U.S. Appl. No. 09/805,859, filed Mar. 13, 2001.
U.S. Appl. No. 09/925,169, filed Aug. 8, 2001.
U.S. Appl. No. 09/756,685.
Translation of the official letter, Aug. 20, 2002, re above–cited references #s 2, 3, and 4.

\* cited by examiner

*Primary Examiner*—Robert A. Siconolfi
*Assistant Examiner*—Melanie Torres
(74) *Attorney, Agent, or Firm*—Beyer Weaver & Thomas, LLP

(57) ABSTRACT

A vibration-damping device for damping vibrations of a vibrative member, which includes a damper mass member having a rigid abutting portion, a spring member for elastically connecting the damper mass member to the vibrative member to cooperate with the damper mass member to constitute a second vibration system whose natural frequency is tuned to a frequency band of the vibrations of the vibrative member, and an independent mass member disposed so as to be opposed to the rigid abutting portion in a vibration input direction with a given gap therebetween without being adhesive to the rigid abutting portion. The independent mass member is independently displaceable relative to and brought into abutting contact directly and elastically with said rigid abutting portion in said vibration input direction.

20 Claims, 8 Drawing Sheets

VIBRATION-DAMPING DEVICE

INCORPORATED BY REFERENCE

The disclosure of Japanese Patent Application No. 2001-042508 filed on Feb. 19, 2001, No. 2001-132860 filed on Apr. 27, 2001, and No. 2002-014515 filed on Jan. 23, 2002 including the specifications, drawings and abstracts are incorporated herein by reference in its entirety.

BACKGROUND OF THE INVENTION

1. Field of the Invention

The present invention relates to a vibration-damping device adapted to be attached to a vibrative member so as to constitute a secondary vibration system for the vibrative member as a primary vibration system, to thereby damp vibrations excited in the vibrative member.

2. Description of the Related Art

A dynamic damper is known as one type of vibration-damping device for damping vibrations excited in a vibrative member that is likely to be vibrated, such as a body of an automotive vehicle. Such a conventional dynamic damper includes a mass member and a spring member for elastically supporting the mass member with respect to the vibrative member, so that the dynamic damper constitutes a secondary vibration system for the vibrative member as a primary fluid system. In the conventional dynamic damper, a natural frequency of the secondary vibration system may be tuned to a frequency band of vibrations excited in the vibrative member, namely, vibrations to be damped, whereby the dynamic damper is capable of exhibiting a desired vibration-damping effect with respect to the vibrative member.

However, the vibration-damping effect of the conventional dynamic damper is limited to a very narrowed frequency range to which the secondary vibration system is tuned. In particular, the presence of the dynamic damper may possibly excite vibrations or a peak in amplitude of the vibrations at other two frequency ranges higher and lower than the frequency range to which the secondary vibration system is tuned, resulting in undesirable deterioration of a vibrating state of the vibrative member.

To cope with this problem, it is considered to form the spring member in the second vibration system of a rubber elastic body having a high damping characteristic, in an attempt to assure a high damping capability with respect to vibrations over a wide frequency range, and to moderate or improve a vibrating state of the vibrative member at the higher and lower frequency range with respect to the frequency range to which the secondary vibration system is tuned.

However, the dynamic damper having the spring member formed of the rubber elastic body is likely to exhibit its damping characteristic influenced by the ambient temperature, since a damping capability of the rubber elastic body has a high temperature dependency. When the dynamic damper is installed in a portion where the ambient temperature widely varies, the damping characteristic of the dynamic damper inevitably varies, leading to possible deterioration of the damping effect of the dynamic damper with respect to intended frequency range. For instance, when the dynamic damper installed on a power unit or an exhaust pipe of an automotive vehicle, the dynamic damper exposed to a relatively wide variation of the ambient temperature ranging from minus several tens to plus one hundred degrees Celsius or more. In this case, the dynamic damper inevitably experiences undesirable variation of its damping characteristic, hence suffering from a problem of difficulty in exhibiting an intended damping effect with high stability.

SUMMARY OF THE INVENTION

It is therefore an object of the invention to provide a novel dynamic damper that is simple in construction and that is capable of exhibiting a high damping effect with high stability.

The above and/or optional objects may be attained according to at least one of the following aspects of the invention. The following preferred forms of the respective aspects of the invention may be adopted at any possible optional combinations. It is to be appreciated that the present invention is not limited to the following forms or combinations of these forms, but may otherwise be recognized based on the thought of the present invention that described in the whose specification and drawings or that may be recognized by those skilled in the art in the light of the disclosure in the whole specification and drawings.

The above object may be achieved according to the principle of the present invention, which provides a vibration-damping device for damping vibrations of a vibrative member, comprising: (a) a damper mass member having a rigid abutting portion; (b) a spring member elastically connecting the damper mass member to the vibrative member for elastically supporting the damper mass member on the vibrative member, and cooperating with the damper mass member to constitute a second vibration system whose natural frequency is tuned to a frequency band of the vibrations of the vibrative member; and (c) an independent mass member disposed so as to be opposed to the rigid abutting portion in a vibration input direction with a given gap therebetween without being adhesive to the rigid abutting portion, and being independently displaceable in relation to the rigid abutting portion to come into abutting contact directly and elastically with the rigid abutting portion in the vibration input direction.

In the vibration-damping device constructed according to the present invention, a vibrational load excited in the vibrative member is applied to the secondary vibration system constituted by the damper mass member and the spring member in the vibration input direction, so that the damper mass member is oscillated in the vibration input direction. The oscillating displacement of the damper mass member excites a resultant displacement of the rigid abutting portion and the independent mass member relative to each other. In particular, the oscillating displacement of the damper mass member is maximized upon application of a vibrational load whose frequency is in a natural frequency range of the secondary vibration system. This leads to a maximized displacement of the independent mass member in relation to the rigid abutting portion, causing the independent mass member to impact on or come into abutting contact with and rebound from the rigid abutting portion repeatedly, resulting in an abutting contact or impact of the independent mass member with or on the rigid abutting portion directly and elastically. As a result, the vibration-damping device exhibits an amplitude attenuating effect with respect to vibrations excited in the vibrative member on the basis of the impact of the independent mass member on the rigid abutting portion. That is, the impact of the independent mass member on the rigid abutting portion functions to increase an apparent loss factor or damping coefficient of the secondary vibration system constituted by the damper mass member and the spring member, so that the vibration-damping device exhibits a high damping characteristic.

The above-indicated advantageous feature of the present invention permits an adoption of an elastic member having a low loss factor, e.g., an metallic spring, as the spring member of the secondary vibration system. Therefore, the vibration-damping device of the present invention can adopt the spring member formed of a metallic spring, a specific elastomer, or the like, which has been less likely to be used as the spring member due to its low loss factor, although it has high temperature resistance. Further, since the amplitude of the damper mass member is effectively attenuated as a result of the impact of the independent mass member against the rigid abutting portion, an amount of displacement of the damper mass member of the secondary vibration system is accordingly restricted, even if the loss factor of the spring member itself is made lower. As a result, a magnitude of a peak amplitude of the resonance of the dynamic damper is decreased. Thus, the vibration-damping device of the present invention is free from the conventionally experienced problem, namely undesirable appearance of the peak amplitude of the vibrations at the two frequency ranges higher and lower than the frequency range to which the secondary vibration system is tuned, since the magnitudes of the peak amplitudes generated at these higher and lower frequency ranges are effectively decreased or attenuated, even if the spring member itself has a low loss factor. Therefore, the vibration-damping device of the present invention is capable of exhibiting high damping effect with respect to vibrations over a wide frequency.

The independent mass member may be formed of a rubber elastic member, a solid or foamed synthetic resin member, or the like in its entirety. In this case, a suitable rigid member may be fixed to these members in order to reinforce the independent mass member. Alternatively, the independent mass member is formed of a rigid material. In this case, at least one of abutting surfaces of the independent mass member and the rigid abutting portion is preferably formed of elastic member such as a rubber elastic body or a synthetic resin member.

It should be appreciated that the vibration-damping device of the present invention includes no member functioning to elastically directly connect the independent mass member and the rigid abutting portion with each other. Namely, an entire outer peripheral surface of the independent mass member is completely independent of the rigid abutting portion. With a center of a profile of the independent mass member placed on a center of a profile of the rigid abutting portion, the abutting surface of the independent mass member is opposed to the abutting surface of the rigid abutting portion with given gaps therebetween. Hence, the independent mass member is displaceable relative to the rigid abutting portion without being adhesive to the rigid abutting portion.

The rigid abutting portion of the damper mass member of the present vibration-damping device may be integrally formed with a body of the damper mass member, or alternatively may be formed independently of a body of the damper mass member and cooperate with the body of the damper mass member to form the damper mass member.

The vibration-damping device constructed according to the present invention may be used for damping vibrations excited in the vibrative member in the form of a rotative member. Namely, in one preferred form of the vibration-damping device of the present invention, the vibrative member comprises the rotative member, and the spring member is disposed on the rotative member so as to extend in a direction perpendicular to a rotation axis of the rotative member so that the damper mass member is disposed radially outward of the rotative member and is subjected to a vibrational load of the rotative member applied thereto in a torsional direction about the rotation axis of the rotative member. In this preferred form of the invention, the vibration-damping device is capable of exhibiting high damping effect with respect to vibrations applied thereto in a circumferential direction about the rotation axis, i.e., vibrations in a torsional direction. In particular, the spring member extending in the direction perpendicular to the rotation axis of the rotative member permits the mass member to be disposed away from the rotative member. Therefore, the vibration excited in the circumferential direction about the rotation axis of the rotative member is effectively applied to the damper mass member, so that the vibration-damping device can exhibit a desired damping effect in an effective and stable manner.

In one advantageous form of the above-indicated one preferred form of the vibration-damping device of the present invention, where the vibration-damping device is used for damping the torsional vibration of the rotative member, the vibration-damping device preferably includes a plurality of pairs of spring members and the damper mass members, which are disposed at respective circumferential positions of the rotative members, and which constitute a plurality of secondary vibrative systems each having a center of gravity located substantially on the rotation axis of the rotative member. This arrangement enables the vibration-damping device to have a weight distribution well balanced in the circumferential direction of the rotative member. Thus, the vibration-damping device is free from or less likely to suffer from a problem that the gravity acting on the vibration-damping device undesirably generates a torque acting on the rotative member to rotate the rotative member toward a specific circumferential direction thereof, even in the case where the rotation axis of the rotative member is inclined to the vertical direction. It is noted that the weight of the second vibration system may include a weight of the independent mass member, which is brought into abutting contact with the rigid abutting portion of the damper mass member.

In another preferred form of the vibration-damping device of the present invention, the spring member is fixed at an fixing portion thereof to the vibrative member and extends from the fixing portion thereof toward an protruding end portion thereof, and has a center of gravity of the damper mass member situated on a side of fixing portion of the spring member rather than the protruding end portion of the spring member in the vibration input direction. This preferred form of the vibration-damping device permits that the damper mass member is located near to the vibrative member, resulting in a reduced overall size of the vibration-damping device and a sufficiently large free length of the spring member.

In yet another preferred form of the vibration-damping device of the present invention, the damper mass member comprises a hollow box-like housing member, while the independent mass member comprises a spherical or circular-rod shaped member having a circular cross sectional shape, and is housed in the housing member. In this preferred form of the invention, the vibration-damping device is capable of easily exhibiting an excellent vibration-damping effect with respect to the vibrations applied in a plurality of vibration input directions. Since the independent mass member is formed of the spherical or circular-rod shaped member having a circular cross sectional shape, the independent mass member is able to be impact against the housing at its abutting surface whose area is effectively reduced. This arrangement effectively lowers resistance to the displacement of the independent mass member, such as friction upon the abutting contact of the independent mass member with the housing member, allowing the independent mass member to impact on and rebound from repeatedly in an easier manner, resulting in a bouncing displacement of the independent mass member with high efficiency. As a result, the vibration-damping device of this preferred form of the invention ensures an increase in its apparent loss factor on the basis of an increased number of impacts (or abutting contacts) of the independent mass member against the housing member.

In one advantageous form of the above-indicated yet another preferred form of the vibration-damping device of the present invention, the housing member has an inner circumferential surface whose profile is made cubic so as to constitute the rigid abutting portion by a pair of flat surfaces that are opposed to each other in the vibration input direction with the independent mass member interposed therebetween, and the independent mass member is brought into abutting contact with the pair of flat surfaces at a circular external peripheral surface thereof. This arrangement permits that the independent mass member is brought into abutting contact with the housing member with its abutting surface area is further reduced, upon the bouncing displacement of the independent mass member, thus lowering resistance to the displacement of the independent mass member, such as friction upon the abutting contact of the independent mass member with the abutting surface of the housing member.

A material of the spring member may be desirably selected from various kinds of spring materials, such as metallic springs, rubber springs and resin springs, taking into account required damping characteristics of the vibration-damping device. There is employed preferably rubber springs made of specific rubber materials such as polymer elastomer, silicone rubber, natural rubber, and a mixture of natural rubber and butadiene rubber due to its low loss factor, more preferably metallic springs due to its low temperature dependency.

In still another preferred form of the vibration-damping device of the present invention, the spring member has a loss factor of not greater than 0.07. Namely, the spring member having the loss factor of not greater than 0.07 enables the damper mass member and its rigid abutting portion to be oscillated with relatively large amplitude, thereby exciting the bouncing displacement of the independent mass member in relation to the rigid abutting portion with high efficiency. Thus, the vibration-damping device of this preferred form is capable of exhibiting an excellent vibration-damping effect in an improved effective manner on the basis of repeatedly generated impact of the independent mass member against the rigid abutting portion.

In a further preferred form of the vibration-damping device of the present invention, the spring member comprises a rubber elastic support member extending in an axial direction thereof with a substantially constant cross sectional shape, and the rubber elastic support member is disposed in the vibration-damping device such that a primary vibrational load excited in the vibrative member is applied to the rubber elastic support member in a radial direction perpendicular to the axial direction of the rubber elastic support member. This arrangement enables the rubber elastic support member to exhibit the same spring characteristic in any radial directions thereof. Thus, the vibration-damping device is capable of exhibiting the substantially same damping effect with respect to input vibrations in any radial directions.

In a yet further preferred form of the vibration-damping device of the present invention, a combined mass of the damper mass member and the independent mass member is held within a range of 4–15% of a mass of the vibrative member. Namely, if the combined mass of the damper mass member is smaller than 4% of the mass of the vibrative member, the vibration-damping device may become insufficient to exhibit an intended damping effect, and if the combined mass of the damper mass member is larger than 15% of the mass of the vibrative member, the vibration-damping device may suffer from a problem of increase in the overall weight of the device. In this respect, when the vibration-damping device includes a plurality of independent mass members, the combined mass of the plurality of independent mass members is interpreted to mean the above-indicated mass of the independent mass member, and when the vibration-damping device includes a plurality of damper mass members, the combined mass of the plurality of damper mass members is interpreted to mean the above-indicated mass of the damper mass member.

In a still further preferred form of the vibration-damping device of the present invention, the vibrations of the vibrative member are applied to the vibration-damping device in a plurality of vibration input directions, and the secondary vibration system has a plurality of natural frequency that are respectively tuned in the plurality of vibration input directions, while the independent mass member is independently displaceable relative to the rigid abutting portion in the plurality of vibration input directions so that the independent mass member is directly and elastically brought into abutting contact with the rigid abutting portion of the damper mass member in the plurality of vibration input directions. In this preferred form of the invention, when the vibration-damping device is subjected to the vibrations excited in the vibrative member in the plurality of vibration input directions, the vibration-damping device is capable of exhibiting a large apparent loss factor of the spring member of the secondary vibration system in the plurality of vibration input directions with the help of the impact or abutting contact of the independent mass member against or with the rigid abutting portions in the plurality of vibration input directions. Therefore, the vibration-damping device of this preferred form of the invention is capable of exhibiting a high vibration-damping effect with respect to the vibrations applied in the plurality of vibration input directions, by tuning the natural frequencies of the secondary vibration system in the plurality of vibration input directions, respectively.

In order to reduce an impact noise generated upon impact of the independent mass member against the rigid abutting portion, at least one of abutting surfaces of the independent mass member and the rigid abutting portion, which surfaces are opposed to each other in the vibration input direction, may preferably have a Shore D hardness of not greater than 80, more preferably, within a range of 20–40, as measured in accordance with ASTM method D-2240. In order to further reduce the impact noise generated upon impact of the independent mass member against the rigid abutting portion, at least one of the abutting surfaces of the independent mass member and the rigid abutting portion is also arranged to have a modulus of elasticity within a range of $1-10^4$ MPa, more preferably, $1-10^3$ MPa, and a loss tangent is not less than $10^{-3}$, more preferably within a range of 0.01–10, preferably.

In a yet still further preferred form of the vibration-damping device of the present invention, the damper mass member includes two rigid abutting portions which are opposed to each other in the vibration input direction with the independent mass member interposed therebetween such that the independent mass member is reciprocatory displaceable between the two abutting portions by a distance within a range of 0.1–1.6 mm so that the independent mass member is brought into impact on the two rigid abutting portions located on opposite sides of the independent mass member in the vibration input direction. Preferably, a spacing between the two rigid abutting portions in the vibration input direction may be determined so that the independent mass member is reciprocatory displaceable between the two rigid abutting portions by a distance within a range of 0.1–1.0 mm.

In the present invention, the rigid abutting portion of the damper mass member may be formed of a metallic material such as an iron and aluminum alloy, or a synthetic resin material, for example. Preferably, the rigid abutting portion is formed of a rigid member having a modulus of elasticity of not smaller than $5 \times 10^3$ MPa, in order to assure both of the rigidity of the rigid abutting portion required for supporting the independent mass member and the desired vibration-damping effect of the vibration-damping device. For instance, the rigid abutting portion of the damper mass member may be formed of a hard synthetic resin material having a modulus of elasticity within a range of $5 \times 10^3$–$5 \times 10^4$. This arrangement may be effective to reduce the impact noise generated upon impact of the independent mass member against the rigid abutting portion, and to improve vibration-damping effect of the vibration-damping device with respect to vibrations in a low frequency band. More preferably, the rigid abutting portion of the damper mass member is formed of rigid materials having a modulus of elasticity of not smaller than $5 \times 10^4$ MPa so that the vibration-damping device is able to exhibit an improved vibration-damping effect with respect to vibrations ranging over intermediate and higher frequency ranges.

BRIEF DESCRIPTION OF THE DRAWINGS

The foregoing and/or further objects features and advantages of the invention will become more apparent form the following description of preferred embodiments with reference to the accompanying drawings in which like reference numerals are used to represent like elements and wherein.

DETAILED DESCRIPTION OF PREFERRED EMBODIMENTS

Figure 1:
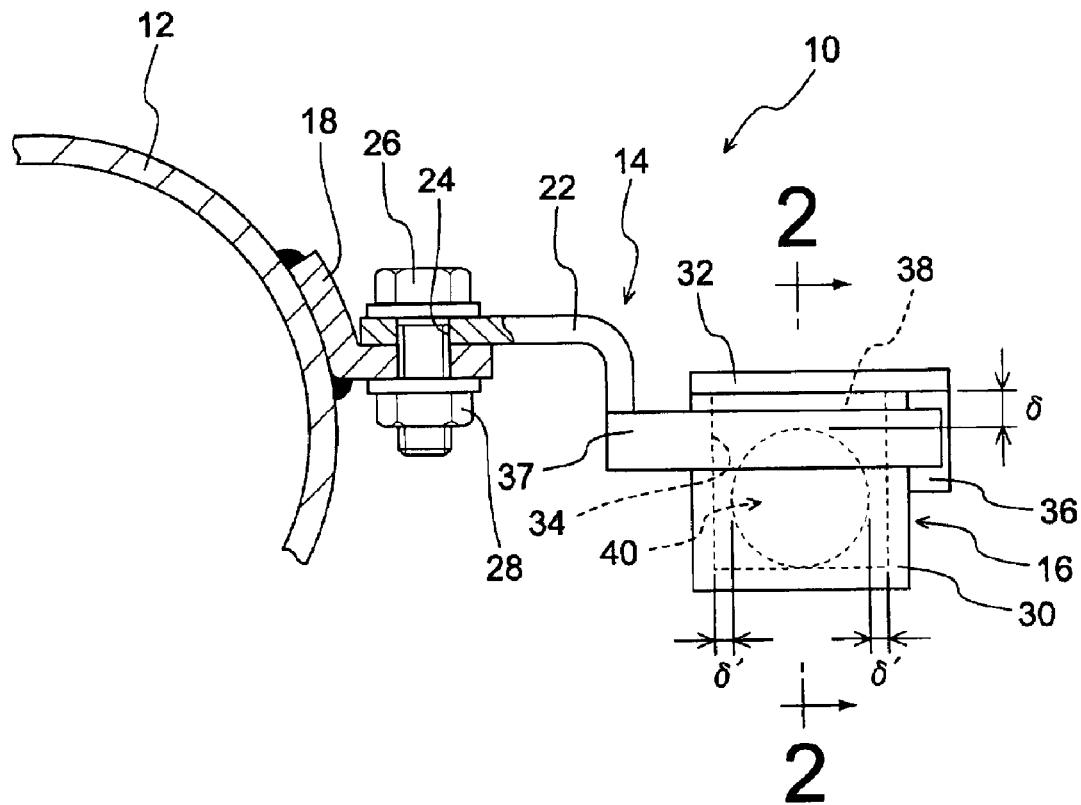
FIG. 1 is an elevational view in vertical cross section of a vibration-damping device constructed according to a first embodiment of the invention, which is attached to a vibrative member.
Figure 2:
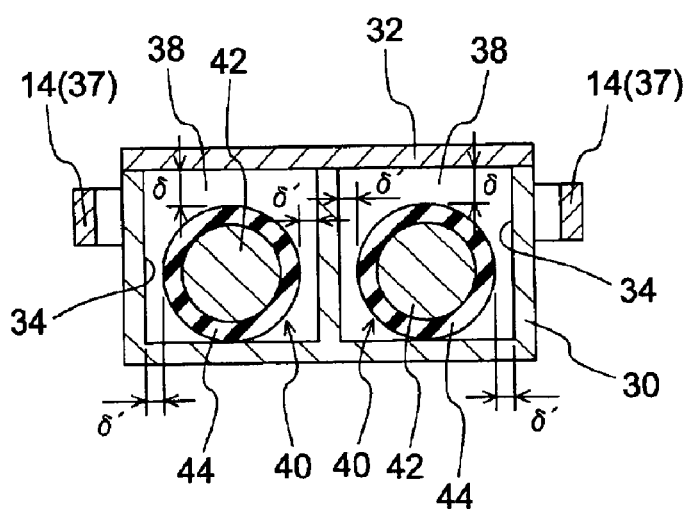
FIG. 2 is a cross sectional view taken along line 2—2 of FIG. 1.
Figure 3:
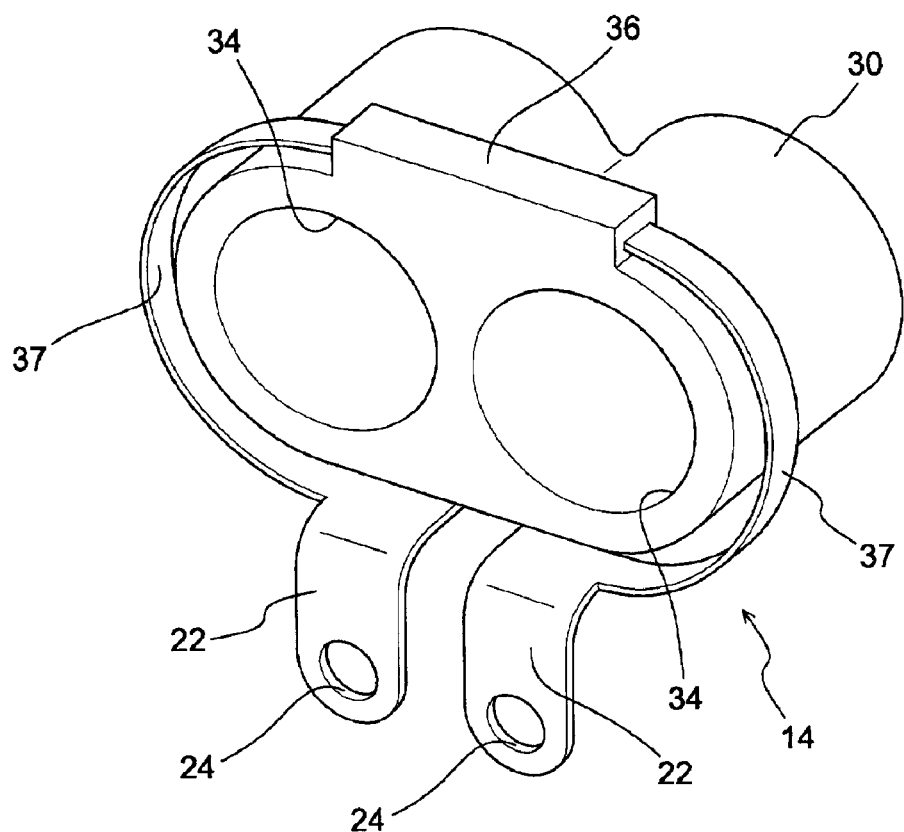
FIG. 3 is a perspective view of a body of a mass member and a leaf spring of the vibration-damping device of FIG. 1.

Referring first to FIGS. 1–3, a vibration-damping device 10 is depicted, which is constructed according to a first embodiment of the present invention. The vibration-damping device 10 includes a spring member in the form of a leaf spring 14 and a damper mass member (a rigid abutting portion) in the form of a damper mass 16, and is attached to a vibrative member in the form of an exhaust pipe 12 of an automotive vehicle such that the damper mass 16 is elastically supported on the exhaust pipe 12 via the leaf spring 14, thus providing a secondary vibration system for the exhaust pipe 12.

More specifically described, the exhaust pipe 12, as is well known, is a tubular member with circular cross section, with one of the axially opposite end portions connected to an internal combustion engine of the vehicle and the other end portion connected to a muffler of the vehicle. The exhaust pipe 12 is suspended from a body of the vehicle by means of suitable muffler supports (not shown). An attachment fitting 18 formed of a rigid metal plate is fixedly mounted on an outer circumferential surface of the exhaust pipe 12 by welding such that the attachment fitting 18 protrudes radially outwardly from the outer circumferential surface of the exhaust pipe 12. The vibration-damping device 10 is mounted on this attachment fitting 18.

The leaf spring 14 is fashioned form spring steel in the form of an elongated band having a generally curved C-shape and possessing substantially the same cross-sectional shape along the entire length thereof. Another feature of the leaf spring 14 is that the two longitudinally opposite end portions disposed facing each other across the opening in the C-shape are curved and extended toward the external periphery, thereby providing a pair of attachment plates 22, 22 integrally formed. This leaf spring 14 has a loss factor of not greater than 0.07. The attachment plate 22, 22 have respective bolt holes 24, 24 formed therethrough. The attachment plates 22, 22 are superposed on and firmly attached to the attachment fitting 18 of the exhaust pipe 12 by means of nuts 28, 28 and bolts 26, 26 extending through the bolt holes 24, 24. Thus, the leaf spring 14 is fixedly attached at its two longitudinal opposite end portions to the exhaust pipe 12.

The damper mass 16 comprises a mass member body 30 and a lid 32 both formed of rigid materials such as metallic materials including aluminum alloy and synthetic resin materials, and both having a modulus of elasticity of not smaller than $5 \times 10^3$ MPa. The mass damper body 30 is a longitudinal block member that extends over a given length with a flattened oval cross sectional shape that is made substantially smaller than the hollow portion of the aforementioned C-shaped leaf spring 14, as shown in FIG. 3. The mass member body 30 has a plurality of mutually independent admission holes, e.g., two admission holes 34, 34 according to the present embodiment, that are open at one of their longitudinally opposite end faces (i.e., the upper end face in the vertical direction as seen in FIG. 2). The admission holes 34, 34 extend rectilinearly in the longitudinal direction of the mass member body 30 with a constant circular cross-sectional shape. Each of the admission holes 34 has a depth dimension, i.e., a length dimension along its central axis which is made substantially equal to its inside diameter dimension. Namely, the admission holes 34, 34 have the same dimensions and shapes, and the central axes thereof are parallel to each other. The external peripheral walls of the mass member body 30 are curved as twin cylinders in accordance with the inner surface configuration of the admission holes 34, 34.

The mass member body 30 further includes a fixing component 36 that is integrally formed on and protrudes outwardly from an outer circumferential surface of one of opposite end portion of the mass member body 30 where the admission holes 34, 34 are opened. The fixing component 36 has a small rectangular block shape and is configured to extend over a given length in the circumferential direction along one of flattened sides of the mass member body 30. The circumferentially oriented central portion of the leaf spring 14 is embedded and fixedly mounted in the fixing component 36 such that the leaf spring 14 extends from the two circumferentially opposite end faces of the fixing component 36. In addition, the leaf spring 14 extending from the two circumferentially opposite end faces of the fixing component 36, loops around the mass member body 30 with a given spacing therebetween, and extends to the other flattened side of the mass ember body 30. This arrangement is effective to reduce a overall size of the vibration-damping device 10, while making it possible to increase the free length of the leaf spring 14.

The two laterally opposite ends of the leaf spring 14 that extend from the fixing component 36 on the two circumferential sides are fixed to the exhaust pipe 12 with the aid of the two attachment plates, 22, 22, thereby allowing the mass member body 30 to be elastically supported by the leaf spring 14 on the exhaust pipe 12. In other words, the C-shaped leaf spring 114 has substantially separate parts on two sides in the circumferential direction as a result of the fact that the circumferential central portion of the leaf spring 14 is embedded and fixedly mounted in the fixing component 36 of the mass member body 30, providing a pair of semicircular supporting spring portions 37, 37 that extend from the fixing component 36 on the two circumferential sides and stretch across less than about a semicircle in the circumferential direction over the outer circumferential surface of the mass member body 30. The mass member body 30 is elastically supported by these supporting spring portions 37, 37 in relation to the exhaust pipe 12. In particular, the spring constant of the leaf spring 14 is determined according to the present embodiment, such that the vertical and horizontal components of the spring constant in FIG. 1 are different from each other. This arrangement makes it easier to take appropriate measure when damping effects need to be achieved in different frequency ranges for the vertical and horizontal vibrations of the exhaust pipe 12 in FIG. 1.

The lid 32 is a flat plate whose flattened oval shape matches the shape of the end face of the mass member body 30 on the open side of the admission holes 34, 34. The lid 32 is superposed on the end faces of the mass member body 30 and fixedly attached thereto by welding, bolting, or the like to cover the openings of the admission holes 34, 34 in the mass member body 30 with the lid 32. A plurality of mutually independent storage spaces 38, 38 (e.g., two storage spaces in the present embodiment) are formed in the damper mass 16 by the closure of the admission holes 34, 34 in the mass member body 30 with the lid 32.

Each storage space 38 houses an independent mass member 40. Each independent mass member 40 consists of a solid spherical metallic mass 42 and a coating rubber layer 44 made of a rubber elastic body and formed on and bonded to an entire surface of the spherical metallic mass 42 with a substantially constant wall thickness. The wall thickness, the type of rubber materials, and other properties of the surface of the coating rubber layer 44 in contact with the damper mass 16 is preferably determined so as to have a Shore D hardness of not greater than 80, more preferably within a range of 20–40, as measured in accordance with ASTM method D-2240. It is also desired that the coating rubber layer 44 has a modulus of elasticity within a range of $1–10^4$ MPa, and a loss tangent not less than $10^{-3}$.

One such independent mass member 40 is housed in each of the storage spaces 38 of the damper mass 16. In a state in which the independent mass members 40 are housed in the storage spaces 38, given gaps are formed along the entire circumference of each independent mass member 40 between the independent mass member 40 and the peripheral wall surfaces of the corresponding storage space 38, allowing the independent mass member 40 to be independently displaced in relation to the peripheral wall surfaces of the storage space 38. It should be appreciated that the damper mass 16 and the plurality (e.g., two in this embodiment) of the independent mass members 40 have the mass in total that is held within a range of 4–15% of the mass of the exhaust pipe 12.

In the present embodiment, the each independent mass member 40 is brought into impact against abutting portions of the damper mass 16, which are opposed to each other in a vibration input direction with the independent mass 40 interposed therebetween. More specifically described, in a static state of the vibration-damping device 10 as shown in FIGS. 1 and 2, where the vibration-damping device 10 is subjected to no vibration excited in the exhaust pipe 12, the each independent mass member 40 is held in contact with lower one of vertically opposite abutting portions of the damper mass 16 (i.e., a peripheral wall surface of the corresponding storage space 38), while being spaced apart from upper one of the vertically opposite abutting portions of the damper mass 16 by a given gap $\delta$. In addition, the each independent mass member 40 is opposed to horizontally opposite abutting portions of the peripheral wall surface of the corresponding storage space 38 with a given gap $\delta'$. The size or distance of the gap $\delta'$ between one of the horizontally opposite abutting portions of the damper mass 16 (i.e., the peripheral wall surface of the storage space 38), and the surface of the independent mass member 40 in contact with the one horizontally opposite abutting portion, is preferably set to 0.05–0.8 mm, and more preferably 0.05–0.5 mm. The size or distance of the gap $\delta$ between the upper one of the vertically opposite abutting portions of the damper mass 16 and the surface of the independent mass member 40 in contact with the upper one of the horizontally opposite abutting portions, is preferably set to 0.1–1.6 mm, more preferably 0.1–1.0 mm. Specifically, the aforementioned $\delta'$ (where $\delta'=\delta/2$) is selected as the size of the gap between the external peripheral surface of the independent mass member 40 and the inner surface on either side of the storage space 38 in the axial direction (depth direction), and between the external peripheral surface of the independent mass member 40 and the inner surface of the cylindrical peripheral wall of the storage space 38 in a state in which the independent mass member 40 is disposed in the center of the storage space 38.

Figure 4:
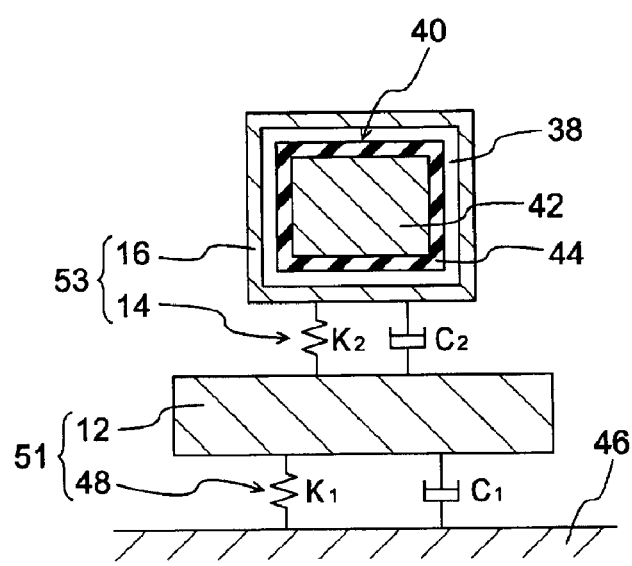
FIG. 4 is a diagram depicting a vibration model of the vibration-damping device of FIG. 1.

FIG. 4 depicts a vibration model of the vibration-damping device 10 constructed according to the above-described embodiment, where the exhaust pipe 12 is supported by an engine 46 of the vehicle via a spring member 48. The spring member 48 may be generally composed of an elastic support member, such as a muffler support, or alternatively is provided by the elasticity of the exhaust pipe as such. A primary vibration system 51 is thus composed of the exhaust pipe 12 as a mass component with a mass M, and the spring member 48 as a spring component with spring constant k1 and a loss factor c1. The damper mass 16 of the vibration-damping device 10 is elastically supported on the exhaust pipe 12 by the leaf spring 14. A secondary vibration system 53 is thus composed of the damper mass 16 and the independent mass members 40, 40 housed therein as a mass component with a mass m and the leaf spring 14 as a spring component with a spring constant k2 and a loss factor c2.

As is understood from the vibration model of FIG. 4, the vibration-damping device 10 in its entirety constitutes the secondary vibration system 53 with respect to the exhaust pipe 12 as the primary vibration system. Therefore, a natural frequency of the secondary vibration system 53 is tuned to a frequency band of undesirable vibrations excited in the primary vibration system, by suitably adjusting the mass m of the mass component and the spring constant k2 of the spring component of the secondary vibration system 53, like in the conventional dynamic damper, so that the vibration-damping device 10 is able to damp the vibrations of the exhaust pipe 12 with the help of resonance of the secondary vibration system 53.

In the vibration-damping device 10 constructed as described above, the damper mass 16 as the mass component of the secondary vibration system 53 is provided with independent mass members 40 capable of being independently displaced relative to other components of the damper mass 16. Therefore, when the damper mass 16 is displaced, the independent mass members 40 are displaced within the storage space 38 relative to the other components of the damper mass 16. This causes the independent mass members 40 to impact on and rebound from the peripheral wall surface of the storage spaces 38 repeatedly, resulting in bouncing displacement of the independent mass members 40 and a repeated impact or strike of the independent mass members 40 against the peripheral wall surface of the storage spaces 38. In addition, the size of the gap δ between the contacting surfaces of the damper mass 16 and the independent mass members 40 is set to a predetermined level in order to achieve high accuracy in selecting an amount of displacement of the independent mass members 40 in relation to the damper mass 16, and specific hardness is selected for the abutting surfaces of the independent mass members 40 and the damper mass 16, allowing the independent mass members 40 to strike or impact on the damper mass 16 directly and elastically under these special conditions in the above-described manner.

The aforementioned suitable adjustment of the impact characteristics and the phase of the independent mass members 40 relative to the damper mass 16 allows the force exerted by the impact of the independent mass members 40 against the damper mass 16 to act on the spring characteristics of the secondary vibration system 53, resulting in an apparent increase in the loss factor c2 of the spring component of the secondary vibration system 53 consisting of the leaf spring 14. Therefore, the vibration-damping device can exhibit an apparent enhanced damping effect, with the help of the repeated impact of the independent mass members 40 on the damper mass 16.

Therefore, the vibration-damping device 10 is able to effectively increase the loss factor c2 of its secondary vibration system 53 with the help of the impact of the independent mass member 40 against the damper mass 16, although the metallic leaf spring 14 whose loss factor is low in comparison with that of natural rubber or the like is adopted as the spring component of the secondary vibration system 53. Thus, the vibration-damping device 10 is capable of exhibiting a high damping effect with the help of the secondary vibration system 53 functioning as a dynamic damper, with respect to vibrations excited in the exhaust pipe 12 as the primary vibration system 51.

It should be appreciated that the metallic leaf spring 14 has spring characteristics whose temperature dependence is much less than that of natural rubber or the like, making it possible to maintain a stable spring constant k2 in the secondary vibration system 53 at temperatures ranging from the low-temperature state at the start of engine operation to the high-temperature state created by exhaust heat. Moreover, the independent mass members 40 are completely independent of the damper mass 16, effectively preventing the high damping effect based on the impact of the independent mass members 40 on the damper mass 16 from being affected by temperature. Thus, the vibration-damping device 10 is capable of exhibiting a desired damping effect across a wide temperature range in an efficient and stable manner.

Further, the repeated impact of the independent mass member 40 on the damper mass 16 attenuates an amplitude of the damper mass 16, so that the vibration-damping device 10 assures a reduced amount of displacement of the damper mass 16 constituting the secondary vibration system 53 while adopting the leaf spring having the low loss factor, resulting in a reduced peak value of the resonance of the secondary vibration system 53. As a result, the peak amplitudes generated at the higher and lower frequency ranges in relation to the natural frequency of the primary vibration system 51 are effectively decreased or attenuated, even if the leaf spring 14 itself has the low loss factor. Therefore, the vibration-damping device 10 is capable of exhibiting high damping effect with respect to vibrations over a wide frequency range.

Another advantageous feature of the present embodiment is that independent mass members 40 having spherical external peripheral surfaces are adopted and the storage spaces 38 in the damper mass 16 are provided with cylindrical configurations, whereby the independent mass members 40 can come into direct and elastic contact with the damper mass 16 under substantially the same conditions in central axial direction of the storage spaces 38 and in any other direction perpendicular to the central axes of the storage spaces 38, allowing the vibration-damping device 10 to achieve the intended damping effect with high efficiency while preventing temperature variations from having any effect with respect to the vibrations occurring in these directions.

Yet another advantageous feature of the present embodiment is that adopting independent mass members 40 with spherical external peripheral surfaces assures makes it possible to reduce the surface area of friction and the resistance of impeded displacement for the damper mass 16 during the bouncing displacement of the independent mass members

40. This allows the independent mass members 40 to be displaced in a more efficient manner as they rebound upon application of a vibrational load to the vibration-damping device 10, effectively providing the bouncing displacement of the independent mass member 40. Thus, the vibration-damping device 10 permits to increase the apparent loss factor of the leaf spring 14 with high efficiency by the independent mass members 40 striking (coming into abutting contact with) the damper mass 16.

Still another advantageous feature of the present embodiment is that adopting independent mass members 40 with spherical external peripheral surfaces prevents the independent mass members 40 from exhibiting any directionality or the like inside the damper mass 16 and stabilizes the conditions under which the independent mass members 40 is brought into abutting contact with the damper mass 16. This makes it possible to further stabilize the damping effect on the basis of the abutting contact or impact of the independent mass members 40 with or on the damper mass 16.

In addition, the coating rubber layer 44 is formed on the external peripheral surface of the independent mass members 40 rather than the inner surfaces of the storage spaces 38. This arrangement makes it possible to effectively vary the load input points on the coating rubber layer 44 substantially uniformly across the entire area of the coating rubber layer 44 by the rotation of the independent mass members 40 inside the damper mass 16 in comparison with cases in which such a coating rubber layer is formed on the inner surfaces of the storage spaces 38. Thus, the vibration-damping device 10 is able to improve the durability of the coating rubber layer 44, and hence the durability thereof.

The use of the plurality (two) of independent mass members 40 makes it possible to reduce the mass of each independent mass member 40 while obtaining a suitable amount of combined mass of the damper mass 16 and independent mass members 40. This facilitates bouncing-like displacement of the independent mass members 40 within the damper mass 16, thereby achieving the apparent increase in the loss factor of the leaf spring 14 in a more efficient manner by the independent mass members 40 repeatedly striking (coming into abutting contact with) the damper mass 16.

Figure 5:
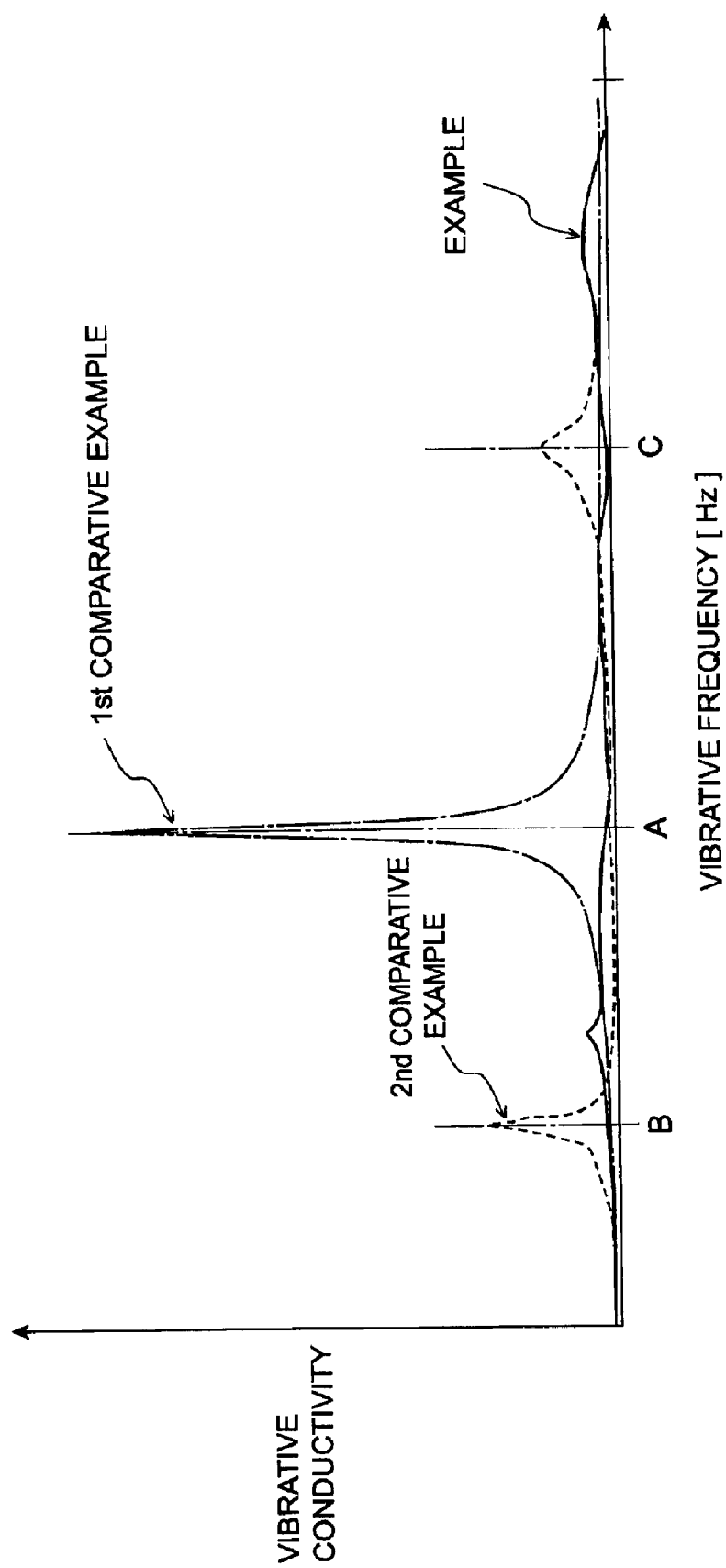
FIG. 5 is a graph showing measured frequency characteristics of vibration transmitting force of the vibration-damping device of FIG. 1 together with the same of a comparative example of a vibration-damping device.

FIG. 5 shows the results of mounting the vibration-damping device 10 constructed as described above on an exhaust pipe 12 and measuring the oscillations of the exhaust pipe 12 while the exhaust pipe 12 is excited by frequency sweep. FIG. 5 also shows the results of Comparative Example 1 in which the same measurement tests were performed on an exhaust pipe 12 devoid of the vibration-damping device 10. FIG. 5 further shows the results of Comparative Example 2 in which the same measurement tests were performed on an exhaust pipe 12 whose dynamic damper was consistent with a conventional structure obtained by fixedly bonding the independent mass members 40 to the damper mass 16 with an adhesive or the like.

The measurement results shown in FIG. 5 demonstrate that the undesirable vibrations occurring near the resonance frequency A of the primary vibration system without a vibration-damping device (Comparative Example 1) can be suppressed in Comparative Example 2 which employs the conventionally configured dynamic damper substantially devoid of the independent mass members 40 intended to strike the damper mass 16, but new vibrations can be seen occurring at frequencies B and C above and below or higher and lower than the resonance frequency A. By contrast, the vibration-damping device of the present embodiment can be proven to reduce the undesirable vibrations occurring near the resonance frequency A of the primary vibration system in accordance with Comparative Example 1 and to suppress the emergence of new resonance phenomena at the frequencies B and C above and below the undesirable resonance frequency A in Comparative Example 2. These facts clearly demonstrate that the present embodiment can provide the vibration-damping device that is novel in construction and that is capable of exhibiting excellent damping effects over a wide variety of frequencies.

Figure 6:
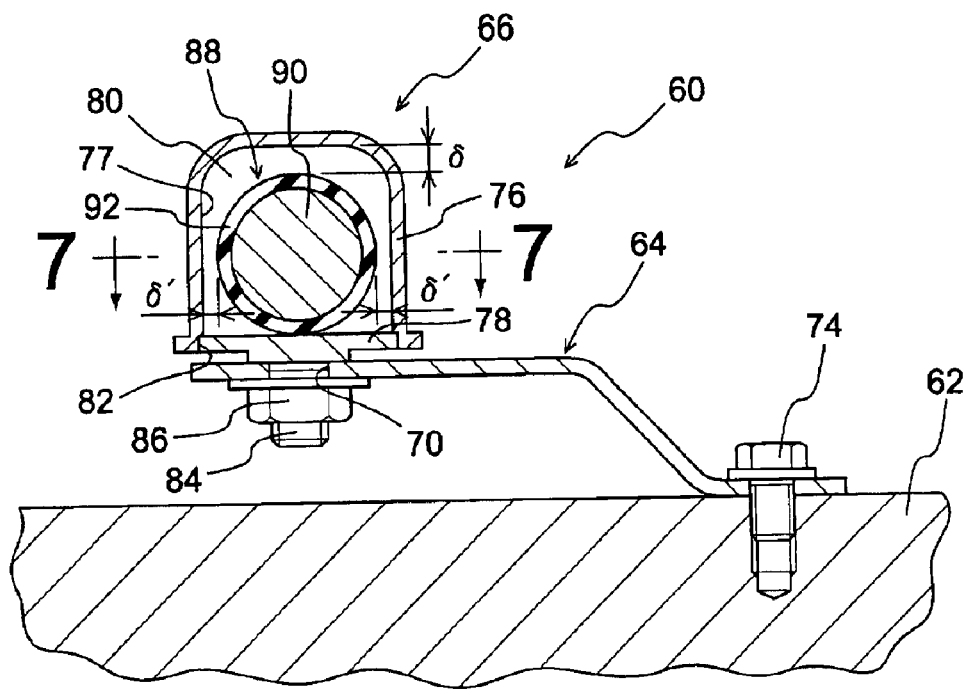
FIG. 6 is an elevational view in vertical cross section of a vibration-damping device constructed according to a second embodiment of the invention, which is attached to a vibrative member.
Figure 7:
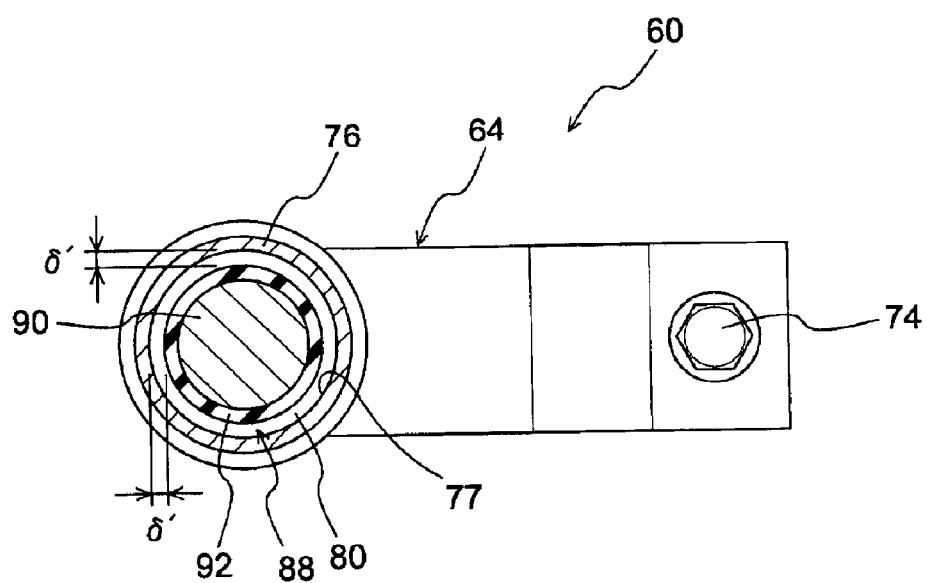
FIG. 7 is a cross sectional view taken along line 7—7 of FIG. 6.

Referring next to FIGS. 6 and 7, a vibration-damping device 60 is depicted, which is constructed according to a second embodiment of the present invention. The vibration-damping device 60 includes a spring member in the form of a leaf spring 64 and a damper mass member in the form of a damper mass 66, and is attached to a vibrative member in the form of a suspension member 62 of an automotive vehicle such that the damper mass member 66 is elastically supported on the exhaust pipe 62 via the leaf spring 14, thus providing a secondary vibration system for the exhaust pipe 62.

More specifically described, the suspension member 62 is a plate-like member made of rigid materials such as steel, and is attached to a body of the vehicle via member mounts or the like. The vibration-damping device 60 is mounted on the suspension member 62 such that the damper mass 66 is elastically supported by the leaf spring 64 on the suspension member 62.

The leaf spring 64 is formed of spring steel having a generally rectangular flat-plate shape, and is bent into a flattened crank in the central portion. The leaf spring 64 has a loss factor not greater than 0.07. One end portion of the leaf spring 64 is superposed on the surface of the suspension member 62 and is fixedly attached to the suspension member 62 by a bolt 74. Fixedly attaching one of the longitudinally opposite end portions of the leaf spring 64 to the suspension member 62 in this manner allows the leaf spring 64 to be positioned at a distance from the suspension member 62 over a section extending from the middle portion of the leaf spring 64 to the other end portion. The damper mass 66 is attached to the projecting end portion (other end portion) of the leaf spring 64, thereby being elastically supported by the leaf spring 64 in a cantilevered fashion.

The damper mass 66 comprises a mass member body 76 and a lid 78 both made of aluminum alloy or the like and having a modulus of elasticity that is arranged in the same manner as in the first embodiment. The mass member body 76 is generally configured as an inverted cup with the open end facing down, and the inside diameter of an inner bore 77 formed therein is set to generally equal to the depth dimension of the inner bore 77. The lid 78 is shaped as a disk that corresponds to the shape of the opening in the inner bore 77 of the mass member body 76. The lid 78 is fitted into the opening in the inner bore 77 of the mass member body 76 and is fixedly attached thereto by welding, bonding, or the like. The opening in the mass member body 76 is thus covered by the lid 78, and a storage space 80 is thus formed in the damper mass 66. A circumferentially extending stepped portion 82 is formed in the opening of the inner bore 77 in the mass member body 76 to help insert and position the lid 78, and the lid 78 rests on the stepped portion 82 when this lid 78 is immovably attached to the mass member body 76.

A downwardly extending bolt 84 is rigidly provided in the central portion of the bottom surface of the lid 78, this bolt 84 is inserted into a mounting hole 70 in the end portion of the leaf spring 64 on the other longitudinally opposite side, and the components are attached to each other with a nut 86. The damper mass 66 is thereby elastically supported by the leaf spring 64 on the suspension member 62, providing a secondary vibration system that comprises the damper mass 66 and the leaf spring 64 and attaches to the suspension member 62 as a primary vibration system.

A single independent mass member 88 is housed in the storage space 80 formed by the lid 78 and the mass member body 76. The independent mass member 88 consists of a metallic mass 90 with a solid spherical configuration and a coating rubber layer 92 composed of a rubber elastic body, and formed on and bonded to the entire surface of the metallic mass 90 with a substantially constant wall thickness in the same manner as the layer bonded to the independent mass members (40) of the first embodiment. The coating rubber layer 92 may have the same material or the like as the layer of the first embodiment.

In a state in which the independent mass member 88 is housed in the storage space 80, specific gaps are formed along the entire circumference of the independent mass member 88 between the independent mass member 80 and the storage space 80, allowing the independent mass member 80 to be independently displaced in relation to the peripheral wall surface of the storage space 80 in the same manner as in the first embodiment. In this respect, since the independent mass member 88 is intended to impact or come into abutting contact with the damper mass 66 on the opposite sides thereof in a primary vibration input direction (i.e., the vertical direction as seen in FIG. 6), the gaps between the independent mass member 88 and the damper mass 66 may have the same dimensions or the like as in the first embodiment. Likewise, a ratio of the combined mass of the independent mass member 88 and the damper mass 66 to the mass of the suspension member 62 is suitably determined in the same manner as in the first embodiment.

The vibration-damping device 60 constructed as described above provides the secondary vibration system whose mass component is composed of the combined mass of the damper mass 66 and the independent mass member 88 hosed in the damper mass 66, and whose spring component is composed of the leaf spring 64 having a specific spring constant and a loss factor. Therefore, the vibration-damping device 60 can exhibit a desired vibration-damping effect by suitably tuning its secondary vibration system.

In the vibration-damping device 60, like the first embodiment, the vibration of the suspension member 62 constituting the primary vibration system reaches the leaf spring 64 and the damper mass 66 constituting the secondary vibration system and excites this secondary vibration system, whereupon the independent mass member 88 in the storage space 80 is displaced in a bouncing-like manner and repeatedly strikes or impact on the damper mass 66. This repeated impact of the independent mass member 88 against the damper mass 66 effectively increase the apparent loss factor of the leaf spring 64. Thus, the vibration-damping device 66 can exhibit a desired damping effect in a stable and effective manner, while adopting the metallic leaf spring 64 as the spring component of the secondary vibration system. In addition, the adoption of the metallic leaf spring 64 allows the vibration-damping device 60 to exhibits a stable damping effect while preventing this damping effect from having any temperature dependence, in contrast to a conventional dynamic damper having a spring member composed of natural rubber or the like.

Moreover, the repeated impact of the independent mass member 88 against the damper mass 66 attenuates an amplitude of the damper mass 66, so that the vibration-damping device 60 enjoys the same advantage as in the first embodiment.

Figure 8:
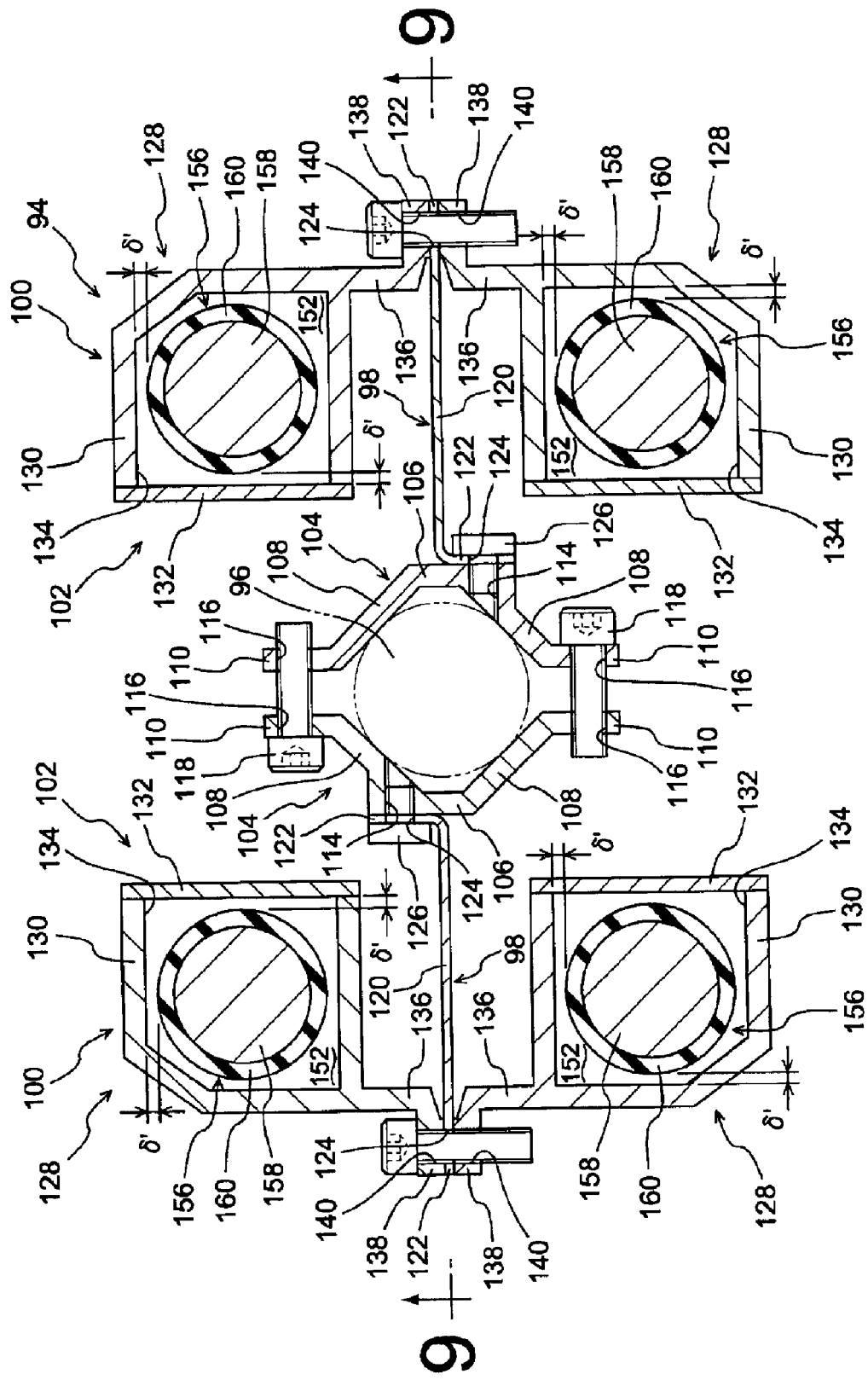
FIG. 8 is an elevational view in vertical cross section of a vibration-damping device constructed according to a third embodiment of the invention, which is attached to a vibrative member.
Figure 9:
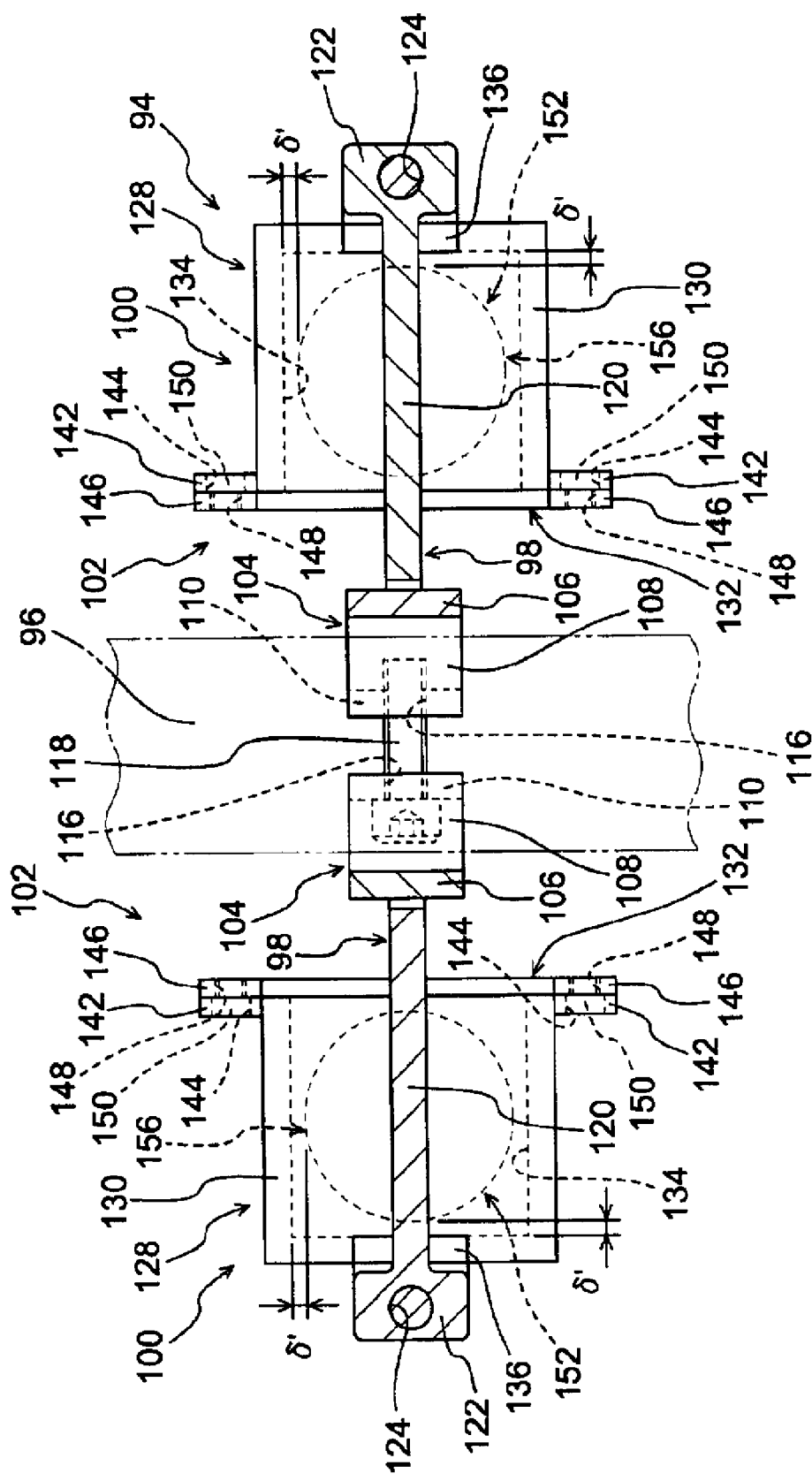
FIG. 9 is a cross sectional view taken along line 9—9 of FIG. 8.

Referring next to FIGS. 8 and 9 a vibration-damping device 94 is depicted, which is constructed according to a third embodiment of the present invention. The vibration-damping device 94 includes a spring member in the form of a leaf spring 98 and a damper mass member in the form of a damper mass 100, and is attached to a vibrative member in the form of a main shaft 96 of an automotive vehicle such that the damper mass 100 is elastically supported on the main shaft 96 via the leaf spring 98, thus providing a secondary vibration system 102 for the main shaft 96.

More specifically described, the main shaft 96 is a solid or hollow rod-shaped member made of rigid materials such as metal and extending straight in the axial direction having a substantially constant circular cross sectional shape. Rotation of a steering wheel (not shown) mounted on one of the axially opposite sides of the main shaft 96 is transmitted to a wheel mounted on the other axially opposite side, thereby allowing the wheel to be steered by the turning of the steering wheel.

The main shaft 96 is provided with a pair of fixing brackets 104, 104. The two fixing brackets 104, 104 are each composed of a rectangular flat plate made of rigid materials such as metal and is fashioned into a substantial V-shape in the longitudinally oriented central portion 106. Specifically, each of the two fixing brackets 104 is provided with inclined portions 108, 108 that extend obliquely outward from the two longitudinally opposite side portions of the central portion 106, and the end portions of the inclined portions 108, 108 are bent into projections 110, 110 that extend parallel to the central portion 106. A mounting hole 114 is formed through one of the two longitudinally opposite sides of the central portion 106, and each of the projections 110, 110 is provided with a bolt hole 116. The fixing brackets 104, 104 are disposed such that the main shaft 96 is sandwiched between the opposite valley sides thereof in the direction perpendicular to the axial direction, and the fixing brackets 104, 104 thus disposed are fixed relative to each other while the main shaft 96 is sandwiched therebetween in the direction perpendicular to the axial direction of the main shaft 96 with the aid of bolts 118 inserted into the bolt holes 116, 116 in the projections 110, 110 facing each other, thereby fixedly mounting the assembly on the main shaft 96. Specifically, the inclined portions 108, 108, 108, 108 of the fixing brackets 104, 104 are pressed against the external peripheral surface of the main shaft 96 in the mounted state, and the two fixing brackets 104, 104 remain firmly attached to the main shaft 96 by the resulting pressure. The two fixing brackets 104, 104 immovably attached to the main shaft 96 in this manner are configured such that the mounting holes 114, 114 provided to the central portions 106, 106 are disposed symmetrically about the central axis of rotation of the main shaft 96.

The leaf springs 98, 98 are each fashioned from spring steel into a generally elongated flat plate. According to the present embodiment, the leaf spring 98, 98 have mutually identical shapes, and hence possess the same spring constant in a direction perpendicular to the plate surface. The leaf spring 98, 98 have a loss factor of not greater than 0.07. Each of the leaf springs 98 comprises a main portion 120 (longitudinally oriented middle portion) and attachment members 122, 122 on the two longitudinally opposite end portions thereof. One of each pair of attachment members 122, 122 is bent substantially 90° in relation to the main portion 120. Each attachment member 122 is provided with a mounting hole 124. The dimension of the main portion 120 in the longitudinal direction is substantially greater than the dimension of the attachment members 122, 122 in the longitudinal direction, and the width dimension of the main portion 120 is less than the width dimension of the attachment members 122, 122 to facilitate elastic deformation in the direction perpendicular to the plane of the leaf springs 98 and to reduce the spring constant. The attachment members 122 disposed on the side that is curved in relation to the main portion 120 are superposed on the external surfaces of the central portions 106 of the fixing brackets 104 and are fixedly bolted to the fixing brackets 104 with bolts 126 inserted into the mounting holes 124 in the attachment members 122 and into the mounting holes 114 in the fixing brackets 104 to secure the leaf springs 98, 98. When mounted, the leaf springs 98, 98 extend in a radial direction perpendicular to the central axis of rotation of the main shaft 96 on the two radially opposite sides away from the main shaft 96. In the present embodiment, the direction perpendicular to the plane of the leaf springs 98, 98 is considered to be substantially vertical when the leaf springs 98, 98 are fixed to the fixing brackets 104, 104 in the above-described manner. The leaf springs 98, 98 thus disposed are provided with corresponding damper masses 100.

Described in detail, the damper masses 100, 100 each comprise a pair of mass portions 128, 128 disposed above and underneath the leaf spring 98, respectively. These mass portions 128, 128 are opposed to each other on both sides of the leaf spring 98 and fixing to each other via the leaf spring 98, to thereby obtain the damper mass 100. For the sake of simplicity of the description, there will be described one of these mass portions 128 because the two mass portions 128, 128 of each pair have the same shape and are disposed symmetrically on both sides of the leaf springs 98, for the sake Specifically, the mass portion 128 comprises a mass member body 130 and a lid 132. The mass member body 130 is shaped as a rectangular box with an open-top recess 134. When measured in the height direction (horizontal direction in FIG. 8), the component has a smaller dimension than does the leaf spring 98 in the longitudinal direction. The recess 134 in the mass member body 130 has a cubic configuration whose inside dimensions are generally the same in the three mutually perpendicular dimensions. A fixing component 136 is provided as an integral projection to the bottom wall portion of the mass member body 130. The fixing component 136 is generally configured as an elongated plate and is integrally shaped as an element that extends outward roughly from the central portion of one of the sides of the mass member body 130 in the bottom wall portion. The projecting end portion 138 of the fixing component 136 is curved to the side opposite from the open side of the mass member body 130, and the central part of the end portion is provided with a through hole 140. The end portions on the open sides of the mass member bodies 130 are provided with attachment components 142, 142 shaped as rectangular flat plates and extended in a direction perpendicular to the direction in which the fixing components 136 are extended, and the attachment components 142, 142 are provided with through holes 144. In the present embodiment, the bottom wall portions are provided with chamfered edges on the side opposite the one on which the fixing components 136 of the mass member bodies 130 are disposed, and chamfered edges are therefore provided at the corresponding positions of the recesses 134.

Every lid 132 is shaped as a rectangular flat plate that matches the open end face of the corresponding mass member body 130. Attachment pieces 146, 146 are provided as integral projections to the lid 132 at positions that match those of the attachment components 142, 142 on the mass member body 130. The lid 132 is superposed on the open end faces of the mass member body 130 and fixedly bolted to the mass member body 130 with bolts 150, 150 inserted into the bolt holes 148, 148 in the attachment pieces 146, 146 of the lid 132 and into the through holes 144, 144 in the attachment components 142, 142 of the mass member body 130. A storage space 152 separated from the outside space is thus formed in the mass portion 128 by the closure of the opening in the mass member body 130 by the lid 132, and the independent mass member 156 described below is placed into the storage space 152. According to the embodiment described herein, the storage space 152 has a substantially hexahedral shape, and the opposite inner wall surfaces are formed by flat surface pairs.

According to the present embodiment, each mass member body 130 and lid 132 is formed of rigid materials such as metal and provided with a modulus of elasticity of not smaller than $5 \times 10^3$ MPa.

In each pair of the mass portions 128, 128 thus constructed, the mass member bodies 130 are disposed inward (toward the main shaft 96) from the projecting end portions of the leaf spring 98, the projecting end portions 138 of the fixing components 136 are superposed onto each other via the interposed attachment member 122 of the leaf spring 98 on the side facing the projecting end portions, and the assembly is fixedly bolted to the leaf spring 98 with bolts inserted into the through holes 140, 140 in the projecting end portions 138, 138 and the mounting holes 124 in the attachment members 122. Each of the secondary vibration systems 102 for the main shaft 96 is thus composed of a leaf spring 98 and a damper mass 100 comprising a pair of mass portions 128, 128. The natural frequency of the main shaft 96 in the secondary vibration systems 102, 102 in a direction related to the central axis of its rotation (that is, in the torsional direction of the main shaft 96) is tuned to the frequency of shimmy vibrations or the frequency of braking-initiated judder vibrations.

According to the embodiment described herein, a pair of mass portions 128, 128 constituting a damper mass 100 fixed to a leaf spring 98 are positioned and fixed after being superposed via the interposed leaf spring 98 within the confines of a projection whose direction is perpendicular to the plane of the leaf spring 98, as described above. The damper masses 100, 100 attached to the leaf springs 98, 98 on the two sides of the main shaft 96 in the same radial direction are arranged symmetrically about the main shaft 96 and are superposed on each other within the confines of a projection made in the same radial direction. Another feature of the present embodiment is that the edge of the mass portion 128 farthest from the central axis of rotation of the main shaft 96 is chamfered into an arc whose radius is equal to the distance between the central axis of rotation of the main shaft 96 and the projecting end portions of the leaf spring 98, allowing the damper masses 100, 100 to be prevented with high efficiency from interfering with other members when the damper masses 100, 100 are subjected to vibrations about the central axis of rotation of the main shaft 96. Moreover, the center of gravity of the two secondary vibration systems 102, 102, that is, the center of gravity of all the damper masses 100, 100 and leaf springs 98, 98 lies on the central axis of rotation of the main shaft 96.

In addition, the independent mass members 156 in the storage spaces 152 formed inside the mass portions 128 have metallic masses 158 in the form of solid spheres fashioned from iron or another metal material of high specific gravity, and the surface of each metallic masses 158 is covered with contact layer 160 consisting of a rubber elastic body, elastomer, or other elastic material and extending across the entire surface of the metallic masses 158 while preserving substantially the same wall thickness dimension. In the present embodiment, the contact layer 160 has a Shore D hardness of not greater than 80, and preferably within a range of 20–40, as measured in accordance with ASTM method D-2240.

In a state in which the independent mass members 156 are housed in the storage spaces 152, specific gaps are formed along the entire circumference of each independent mass member 156 between the independent mass member 156 and the inner wall surfaces of the corresponding storage space 152 in the same manner as in the first embodiment, allowing the independent mass member 156 to be independently displaced in relation to the inner wall surfaces of the storage space 152. The size of the gap $\delta'$ between the independent mass member 156 and the inner wall surfaces of the storage space 152 is set to the same level as in the first embodiment, as are other parameters.

The embodiment described herein is such that when an independent mass member 156 is housed in a storage space 152, the center of gravity of the damper mass 100 is disposed at a point on the leaf spring 98 that is shifted toward the main shaft 96 away from the end portion of the leaf spring 98 (which extends from the main shaft 96) within the confines of a projection whose direction is perpendicular to the plane of the leaf spring 98, which is the direction in which the vibrations to be dampened are received from the main shaft 96. In the particular case of the present embodiment, the center of gravity is disposed substantially in the center of the longitudinally oriented main portion 120 of the leaf spring 98. It is assumed that the distance between the center of the independent mass member 156 and the central axis of rotation of the main shaft 96 is the same for each independent mass member 156 when it is disposed at the central point of its displacement inside the storage space 152. In other words, the centers of the independent mass members 156 lie on a circle described about the central axis of rotation of the main shaft 96. Since the independent mass members 156 have the same shapes and dimensions, the center of gravity of the vibration-damping device 94 (that is, the center of gravity of all the independent mass member 156, damper masses 100, and leaf springs 98) lies on the central axis of rotation of the main shaft 96 when the independent mass members 156 are inside the storage spaces 152, allowing the weight of the vibration-damping device 94 to be uniformly distributed in the circumferential direction in relation to the main shaft 96, and efficiently preventing the vibration-damping device 94 from stably occupying a prescribed position in the circumferential direction of the main shaft 96 under the action of gravity. According to the present embodiment, the combined mass of the four independent mass members 156 and the four mass portions 128 is set to between 4 and 15% of the mass of the main shaft 96.

The vibration-damping device 94 constructed as described above provides the secondary vibration system 102 whose mass component is composed of the combined mass of the damper mass 100, i.e., the pair of the mass portions 128 and the independent mass members 156 hosed in the mass portions 128, and whose spring component is composed of the leaf spring 98 having a specific spring constant and a loss factor. Therefore, the vibration-damping device 60 can exhibit a desired vibration-damping effect by suitably tuning its secondary vibration system 102.

The vibration-damping device 94 thus configured is similar to the one described with reference to the first embodiment in that the vibrations to be damped in the main shaft 96 as a component of the primary vibration system (that is, the vibrations of the main shaft 96 in the torsional direction in accordance with the present embodiment) are allowed to reach the damper masses 100, 100 and the leaf springs 98, 98 (which constitute the secondary vibration systems 102, 102), thereby oscillating the damper masses 100, 100. In this process, the independent mass members 156 in the storage spaces 152 are displaced and rebounded, thus repeatedly striking the mass portions 128 while rebounding therefrom. Consequently, the vibration-damping device 94 with the metal leaf springs 98, 98 is capable of effectively exhibiting a high vibration-damping effect with respect to vibrations of the main shaft 96 in the torsional direction on the basis of the apparent loss factor enhancement effect resulting from the contact or impact of the independent mass members 156 with or against the mass portions 128. This makes it possible to provide a vibration-damping device that has minimal temperature dependence and can be effective in terms of damping the vibrations of the main shaft 96 in the torsional direction.

Another advantageous feature of the present embodiment is that the leaf springs 98, 98 are disposed such that they extend on both sides in the same radial direction perpendicular to the central axis of rotation of the main shaft 96, allowing the points at which the damper masses 100 are supported by the leaf springs 98 to be disposed at a distance from the main shaft 96 and making it possible to increase the free length of the leaf springs 98.

Yet another advantageous feature of the present embodiment is that the center of gravity of an independent mass member 156 lies substantially in the center of the main portion 120 of the corresponding leaf spring 98 within the confines of a projection in the input direction of the vibrations to be damped, making it possible to make the entire vibration-damping device 94 more compact when a greater free length is secured for the leaf springs 98 in the above-described manner and to efficiently prevent the damper masses 100 from interfering with other members or creating other problems when the vibration-damping device 94 is mounted on the main shaft 96.

Still another advantageous feature of the present embodiment is that because a plurality of (four) independent mass members 156 are used, the mass of each independent mass member 156 can be reduced while the combined mass of the damper masses 100 and independent mass members 158 can be adequately maintained. As a result, the independent mass members 158 can be displaced with greater ease as they rebound in the process, and the apparent increase in the loss factor of the leaf springs 98 can be achieved in a more efficient manner by the independent mass members 158 repeatedly striking (coming into abutting contact with) the mass portions 128.

Figure 10:
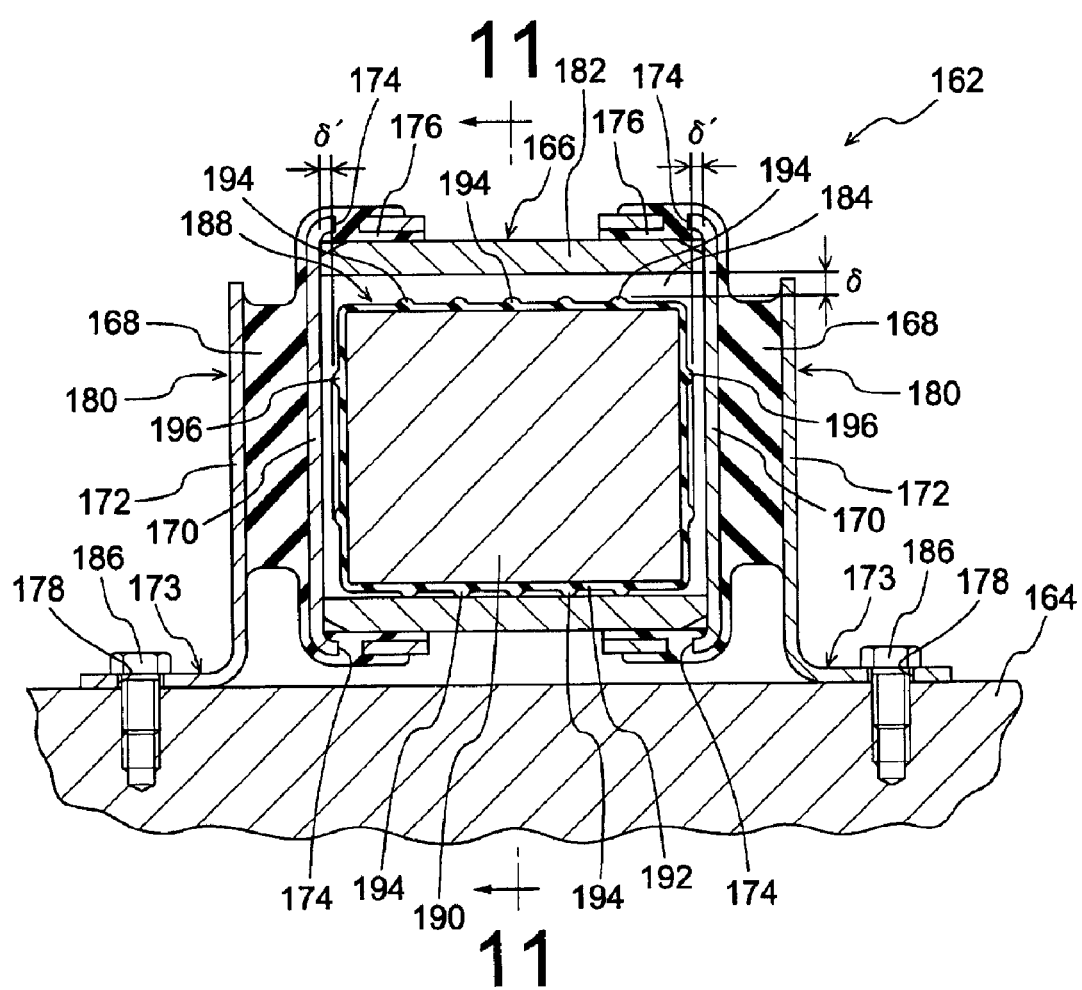
FIG. 10 is an elevational view in vertical cross section of a vibration-damping device constructed according to a fourth embodiment of the invention, which is attached to a vibrative member, and which is taken along line 10—10 of FIG. 11.
Figure 11:
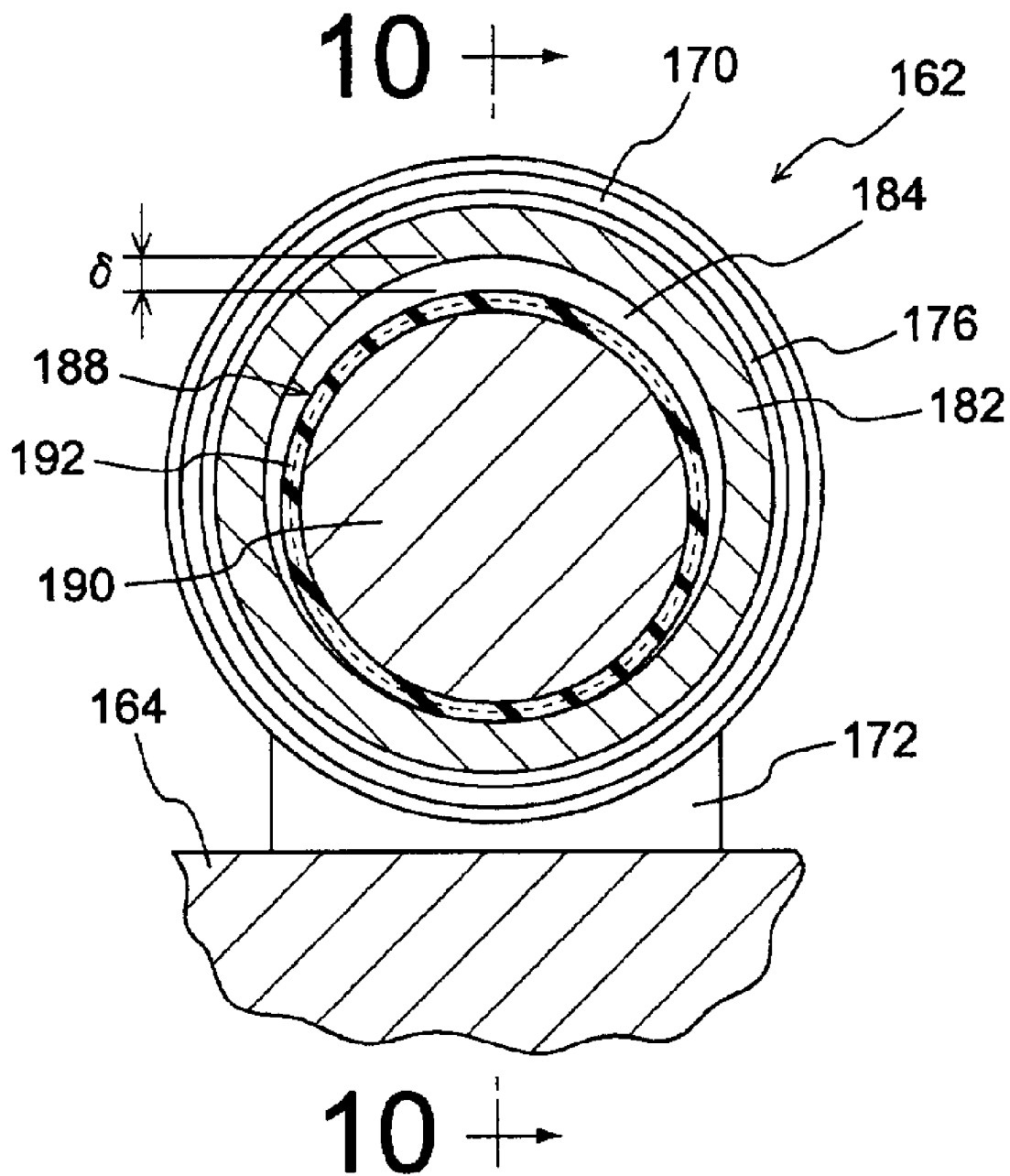
FIG. 11 is a cross sectional view taken along line 11—11 of FIG. 10.

Referring next to FIGS. 10 and 11, a vibration-damping device 162 is depicted, which is constructed according to a fourth embodiment of the present invention. The vibration-damping device 94 includes a spring member in the form of a pair of elastic support members 168 and an abutting portion (a housing) in the form of a damper mass 166, and is attached to a vibrative member in the form of a sub frame 164 of an automotive vehicle such that the damper mass 166 is elastically supported on the sub frame 164 via the pair of elastic support members 168, thus providing a secondary vibration system for the sub frame 164. The vibration-damping device 162 is mounted on the sub frame 164 via a bracket 172 (which will be described below). With the vibration-damping device 162 being installed in position, a primary vibrations excited in the sub-frame 164 is primary applied to the vibration-damping device 162 in vibration input directions conforming to vertical and horizontal directions of the vibration-damping device 162 as seen in FIG. 11.

More specifically described, the pair of elastic support members 168 are cylindrical elastic body made of natural rubber or a mixture of natural rubber and butadiene rubber and extending in its axial direction with constant circular cross section. Each of the elastic support member 168 has a loss factor of not greater than 0.07. One end face of the each elastic support member 168 is secured to a fixing member 170 and the other end face of the each elastic support member 168 is secured to the bracket 172. The each fixing member 170 is fashioned from metal into a shallow cylindrical cup and disposed in a vertical position with the open end facing an inside of the damper mass 166 and with the bottom wall secured to the elastic support member 168 in the process of vulcanization of a rubber material for forming the elastic support member 168. The cylindrical portion of the fixing member 170 is provided with a plurality through holes 174 formed therethrough. A coating rubber layer 176 composed of a rubber elastic body and integrally formed with the elastic support member 168 is formed on and bonded to an entire inner circumferential surface of the cylindrical wall portion of the fixing member 170 with a substantially constant wall thickness. On the other hand, the each bracket 172 is fashioned from metal into a generally rectangular flat plate. One of the longitudinally opposite end portions of the bracket 172 is bent into a fixing portion 173 that is provided with a bolt hole 178 formed therethrough. The other end portion of the bracket 172 is bonded to the corresponding end face of the elastic support member 168 in the above-indicated vulcanization process. Therefore, the each elastic support member 168 and the corresponding fixing member 170 and bracket 172 cooperate to constitute an integral vulcanized intermediate assembly 180.

Thus constructed integrally vulcanized intermediate assemblies 180, 180 are assembled with a metallic thick-walled cylindrical member 182 on the axially opposite sides of the cylindrical member 182. Described in detail, the cylindrical member 182 is provided with tapered portions at radially outer edges of the axially opposite end faces thereof. This tapered portions of the cylindrical member 182 are forcedly pressed into recesses of the respective fixing members 170, 170, whereby the cylindrical member 182 and the integrally vulcanized intermediate assemblies 180, 180 are assembled together with the axially opposite openings of the cylindrical member 182 being fluid-tightly closed by means of the respective fixing members 170, 170. In this state, the cylindrical member 182 and the integrally vulcanized intermediate assemblies 180, 180 cooperate to constitute the damper mass 166 having a storage space 184 therein straightly extending in the axial direction with constant circular cross section. In the present embodiment, the cylindrical member 182 and the fixing members 170, 170 all have a modulus of elasticity of not smaller than $5 \times 10^3$ MPa.

The integrally vulcanized intermediate assemblies 182, 182 assembled with the cylindrical member 182 are superposed at their fixing portion 173 on the sub-frame 164, and fixedly mounted on the sub-frame 164 with the aid of bolts 150, 150 inserted into the bolt holes 178, 178 in the fixing portion 173, 173, whereby the damper mass 166 is elastically supported on the sub-frame 164 via the pair of elastic support members 168, 168. Hence, is provided the secondary vibration system for the sub-frame 164, as a primary vibration system, which comprises the damper mass 166 and the pair of elastic support members 168, 168. In the present embodiment, the elastic support members 168, 168 are subjected to shear deformation upon application of the vibrational load in the vibration input directions, and an independent mass member 188 is housed in the storage space 184.

The independent mass member 188 consists of a metallic mass 190 fashioned from a high gravity metallic material such as iron into a solid cylindrical rod extending straightly with constant circular cross section, and a coating rubber layer 192 composed of a rubber elastic body and formed on and bonded to an entire surface of the metallic mass 190. A plurality of elastic circumferential projections 194, each having a semi-circular cross sectional shape, are integrally formed on the circumferential surface of the coating rubber layer 192 and extends over an entire circumference of the circumferential surface. Likewise, elastic annular projections 196, each having a semi-circular cross sectional shape, are integrally formed on respective axially opposite circular plane surfaces. The presence of the elastic circumferential projections 194 allows the independent mass member 188 to come into abutting contact with the damper mass 166 via the elastic circumferential projections 194, when vibrational loads applied to the vibration-damping device 162 in the vibration input directions, namely in the vertical and horizontal directions in FIG. 11. In this respect, abutting portions of the coating rubber layer 192, which are intended to be brought into contact with the damper mass 166, are arranged in the same manner as in the coating rubber layer (44) of the first embodiment in terms of rigidity, compressive elasticity modulus, and loss tangent.

In a stage where the independent mass member 188 constructed as described above being housed in the storage space 184 of the damper mass 166, a specific gaps are formed along the entire circumference of the independent mass member 190 between the independent mass member 188 and the storage space 184, allowing the independent mass member 188 to be independently displaced in relation to the peripheral wall surface of the storage space 184 in the same manner as in the first embodiment. In this respect, since the independent mass member 188 is intended to strike or come into abutting contact with the damper mass 166 on the opposite sides thereof in a primary vibration input direction (i.e., the vertical and horizontal directions as seen in FIG. 11), the gaps δ' between the independent mass member 188 and the damper mass 166 may have the same dimensions or the like as in the first embodiment. According to the present embodiment, the combined mass of the independent mass member 188 and the damper mass 166 is set to between 4 and 15% of the mass of the sub-frame 164.

The vibration-damping device 162 constructed as described above provides the secondary vibration system whose mass component is composed of the combined mass of the damper mass 166 and the independent mass member 188 hosed in the mass damper 166, and whose spring component is composed of the pair of elastic support members 168, 168 having a specific spring constant and a loss factor. Therefore, the vibration-damping device 162 can exhibit a desired vibration-damping effect by suitably tuning its secondary vibration system.

In the vibration-damping device 162, like the first embodiment, the vibration of the sub-frame 164 as the primary vibration system (i.e., vibrations in the vertical and horizontal directions in FIG. 11) reaches the pair of elastic support members 168, 168 and the damper mass 166 constituting the secondary vibration system and excites this secondary vibration system, whereupon the independent mass member 188 in the storage space 184 is displaced in a bouncing-like manner and repeatedly strikes or impact on the damper mass 166. This repeated impact of the independent mass member 88 against the damper mass 66 effectively increase the apparent loss factor of the elastic support members 168, 168. Thus, the vibration-damping device 162 can exhibit a desired damping effect in an effective manner with respect to a plurality of vibrations (i.e., vertical and horizontal directional vibrations) excited in the sub-frame 164, on the basis of the apparent loss factor enhancement effect resulting from the contact or impact of the independent mass members 188 with or against the damper mass 166.

The vibration-damping device 162 can enjoy the same advantage described above with respect to the first embodiment, since the amplitude of the damper mass 166 is effectively attenuated on the basis of the abutting contact of the independent mass members 188 with the damper mass 166.

Another advantageous feature of the present embodiment is that adopting elastic support members 168 with circular cross section allows the elastic support members 168 to exhibit the same spring characteristics in all radial directions perpendicular to the central axis thereof, thereby assuring the same damping effect of the vibration-damping device 162 with respect to vibrations applied in various radial directions. For the above reason, the vibration-damping device 162 can exhibits an excellent vibration-damping effect with respect to vibrations of the sub-frame 164, which are applied to the vibration-damping device 162 in a plurality of directions.

In the present embodiment, the vibration-damping device 164 is oriented so as to receive the primary vibrations of the sub-frame 164 in its vertical and horizontal directions as seen in FIG. 11 where the elastic support members 168 are subjected to the shear deformation. However, the vibration-damping device 164 may be subjected to vibrations applied thereto in the horizontal direction as seen in FIG. 10 where the elastic support members 168 are subjected to compression and tensile stress, depending on a position on which the vibration-damping device 164 is installed. In this case, the vibration-damping device 164 is capable of exhibiting an excellent vibration-damping effect with respect to input vibrations on the basis of the abutting contact of the independent mass member 188 with the damper mass 166, likewise, via the annular elastic projections 196.

While the presently preferred embodiments of this invention have been described above in detail for illustrative purpose only, it is to be understood that the invention is not limited to the details of the illustrated embodiments, but may be otherwise embodied.

For instance, the spring member is formed of spring steel in the illustrated first through third embodiments, the principle of the present invention may be applicable to vibration-damping devices as described in JP-A-8-028627 and JP-U-066039 by way of exampled, in which the spring members are formed of a rubber elastic body having a high damping characteristic. In particular, when the principle of the invention is applied to a dynamic damper having a secondary vibration whose spring component is formed of a rubber elastic body, the dynamic damper may possibly suffer from undesirable variation in a loss factor or other spring characteristics of the spring member, due to the temperature variation of the spring member of the secondary vibration system, which is composed of the rubber elastic body. This possible problem may be eliminated or reduced with the help of the impact or abutting contact of the independent mass member against or with the abutting portion, whereby the vibration damper can exhibit a high damping effect with respect to vibrations over a wide frequency range.

While the single independent mass member 40, 88, 156, 188 is housed in the storage space 38, 80, 152, 184 in the illustrated first through fourth embodiments, the present invention is not particularly limited to the structure of the illustrated embodiment. For instance, a plurality of independent mass members may be housed in the storage space. In this case, the plurality of independent mass members may have a variety of configurations. For instance, the plurality of independent mass members may be identical or varied in size. Further, the plurality of independent mass members may be disposed in series or in parallel with each other in the vibration input direction. While the damper mass 16, 66, 100, 166 itself constitutes the abutting portion in the illustrated first through fourth embodiments, the abutting portion may be formed independently of the damper mass 16, 66, 100, 166.

The configurations of the abutting portion and the independent mass member are not particularly limited to the illustrated embodiments, but may be suitably determined taking into account a space for installing the vibration-damping device. For instance, the abutting portion may have a polygonal shape or a spherical shape, while the independent mass member has a flat plate shape.

In the illustrated first through fourth embodiments, the abutting portion is configured to provide the housing providing the storage space therein, and the independent mass member is housed in the storage space formed within the abutting portion. The abutting portion and the independent mass member may have a variety of configurations, without being limited by the illustrated embodiment. For instance, the abutting portion is configured as a cylindrical rod with circular cross section, which is fixed to the damper mass, while the independent mass member is configured as an annular member disposed radially outwardly of the cylindrical rod. In the combination of the rod shaped abutting portion and the annular independent mass member, the inner circumferential surface of the independent mass member strikes on or comes into abutting contact with the outer circumferential surface of the rod shaped abutting portion.

The coating rubber layer may possibly be formed on the abutting surface of the abutting portion. This arrangement permits to adopt a rigid member with no rubber coating as an independent mass member.

While the secondary vibration systems 102, 102 are disposed symmetrically about the main shaft 96 in the third embodiment, this arrangement is not essential to practice the present invention.

The vibration-damping device 94 constructed according to the third embodiment is mounted on the main shaft 96 consisting a steering system of an automotive vehicle. The principle of the present invention may be applicable to a vibration-damping device to be mounted on another rotative member, e.g., a crankshaft and a propeller shaft, which normally rotate at a higher speed in comparison with the main shaft 96.

In the fourth embodiment, the cylindrical member 182 is forcedly pressed into the fixing members 170, 170 upon assembling these components 182, 170, 170. These cylindrical member 182 and fixing members 170, 170 may be assembled according to a variety of know manners. For instance, the fixing members 170, 170 are disposed radially outwardly on the axially opposite end portions of the cylindrical member 182, and the fixing members 170, 170 are pressed onto the respective end portions of the cylindrical member 182 by drawing, whereby these components 182, 170, 170 are firmly assembled together.

In the fourth embodiment, the each elastic support member 168 is configured to have a cylindrical rod shape with circular cross section, and is disposed so as to receive vibrational loads in radial directions perpendicular to its central axis. The each elastic support member 168 may have a variety of rod shapes with ellipsoidal cross section, polygonal cross section, and the like, and is disposed so as to receive vibrational loads in directions perpendicular to their central axes. This arrangement makes it possible to vary the spring characteristics of the elastic support member in the directions perpendicular to the central axis of the elastic support member in an easy manner.

While the independent mass members 40, 88, 156, 188 come into impact against the damper masses 16, 66, 100, 166 at the opposite sides thereof in the vibration input direction, in the first through fourth embodiments, this arrangement is not essential to practice of the present invention. Namely, the vibration-damping device of the present invention may be configured such that the independent mass member comes into impact against the abutting portion at one of opposite sides thereof in the vibration input direction. This arrangement permits the gap distance between the independent mass member and the abutting portion to be made larger than 1.6 mm.

The principle of the present invention is applicable to not only vibration-damping devices for a suspension member, a main shaft of a steering system and a sub-frame according to the illustrated embodiments, but also vibration dampers for a body and other members of automotive vehicles, and additionally to various vibration-damping devices which are employed in other structures than automotive vehicles.

It is also to be understood that the present invention may be embodied with various other changes, modification sand improvements, which may occur to those skilled in the art, without departing from the spirit and scope of the invention defined in the following claims.

What is claimed is:

1. A vibration-damping device for damping vibrations of a vibrative member that is a primary vibration system having a first spring component and a first mass component, comprising:

a damper mass member having a second mass component with a rigid abutting portion;

a spring member having a second spring component separate from the first spring component, and elastically connecting said damper mass member to the vibrative member for elastically supporting said damper mass member on the vibrative member, and cooperating with said damper mass member to constitute a second vibration system whose natural frequency is tuned to a frequency band of the vibrations of the vibrative member; and an independent mass member disposed so as to be opposed to said rigid abutting portion in a vibration input direction with a given gap therebetween without being adhesive to said rigid abutting portion, and being independently displaceable in relation to said rigid abutting portion to come into abutting contact directly and elastically with said rigid abutting portion in said vibration input direction.

2. A vibration-damping device according to claim 1, wherein said vibration-damping device is adapted to be attached to the vibrative member in the form of a rotative member, and the spring member is disposed on the rotative member so as to extend in a direction perpendicular to a rotation axis of the rotative member so that the damper mass member is disposed radially outward of the rotative member and is subjected to the vibrational of the rotative member applied thereto in a torsional direction about the rotation axis of the rotative member.

3. A vibration-damping device according to claim 2, wherein the vibration-damping device includes a plurality of pairs of spring members and the damper mass members, which are disposed at respective circumferential positions of the rotative members, and which constitute a plurality of secondary vibrative systems each having a center of gravity located substantially on a rotation axis of the rotative member.

4. A vibration-damping device according to claim 1, wherein said spring member is fixed at an fixing portion thereof to the vibrative member and extends from the fixing portion thereof toward an protruding end portion thereof, and a center of gravity of said damper mass member is situated on a side of fixing portion of said spring member rather than said protruding end portion of said spring member in said vibration input direction.

5. A vibration-damping device according to claim 1, wherein said damper mass member comprises a hollow box-like housing member, and the independent mass member comprises a spherical or circular-rod shaped member having a circular cross sectional shape, and is housed in the housing member.

6. A vibration-damping device according to claim 5, wherein the housing member has an inner circumferential surface whose profile is made cubic so as to constitute said rigid abutting portion by a pair of flat surfaces that are opposed to each other in said vibration input direction with said independent mass member interposed therebetween, and said independent mass member is brought into abutting contact with said pair of flat surfaces at a circular external peripheral surface thereof.

7. A vibration-damping device according to claim 1, wherein a combined mass of said damper mass member and said independent mass member is held within a range of 4–15% of a mass of said vibrative member.

8. A vibration-damping device according to claim 1, wherein said spring member is composed of a metallic spring.

9. A vibration-damping device according to claim 8, wherein said metallic spring comprises a leaf spring that is fixed at one of longitudinally opposite ends thereof to the vibrative member and at an other one of said axially opposite end thereof to said damper mass member so that said damper mass member is elastically supported by said leaf spring in a cantilevered fashion.

10. A vibration-damping device according to claim 8, wherein said metallic spring comprises a leaf spring in the form of an elongated band having a generally curved C-shape that includes a supporting spring portion formed at a circumferentially intermediate portion thereof and a pair of attachment portion formed at circumferentially opposite end portions to be attached to the vibrative member, and wherein said damper mass member is disposed in a hollow portion of said C-shaped leaf spring and is attached to a circumferentially central portion of said supporting spring portion of said leaf spring.

11. A vibration-damping device according to claim 1, wherein said spring member comprises a rubber elastic support member extending in an axial direction thereof with a substantially constant cross sectional shape, and said rubber elastic support member is disposed in said vibration-damping device such that a primary vibrational load excited in said vibrative member is applied to said rubber elastic support member in a radial direction perpendicular to said axial direction of said rubber elastic support member.

12. A vibration-damping device according to claim 11, wherein said spring member comprises a pair of said rubber elastic support members disposed in opposite sides of said damper mass member in a direction perpendicular to said vibration input direction.

13. A vibration-damping device according to claim 11, wherein said rubber elastic support member is made of a rubber material selected from the group consisting of natural rubber and a mixture of natural rubber and butadiene rubber.

14. A vibration-damping device according to claim 1, wherein said spring member has a loss factor of not greater than 0.07.

15. A vibration-damping device according to claim 1, wherein said vibrations of the vibrative member are applied to said vibration-damping device in a plurality of vibration input directions, and said secondary vibration system has a plurality of natural frequencies that are respectively tuned in said plurality of vibration input directions, while said independent mass member is independently displaceable relative to said rigid abutting portion in said plurality of vibration input directions so that the independent mass member is directly and elastically brought into abutting contact with the rigid abutting portion of the damper mass member in the plurality of vibration input directions.

16. A vibration-damping device according to claim 1, wherein at least one of abutting surfaces of said independent mass member and said rigid abutting portion, which surfaces are opposed to each other in said vibration input direction, has a Shore D hardness of not greater than 80.

17. A vibration-damping device according to claim 1, wherein said damper mass member includes two rigid abutting portions which are opposed to each other in said vibration input direction with the independent mass member interposed therebetween such that said independent mass member is reciprocatory displaceable between said two rigid abutting portions by a distance within a range of 0.1–1.6 mm so that the said independent mass member is brought into impact on said two rigid abutting portions located on opposite sides of said independent mass member in said vibration input direction.

18. A vibration-damping device according to claim 1, wherein said rigid abutting portion of said damper mass member is formed of a rigid material having a modulus of elasticity of not smaller than $5 \times 10^3$ MPa.

19. A vibration-damping device according to claim 1, wherein said independent mass member includes a coating rubber layer formed on and bonded to an entire outer peripheral surface thereof, said coating rubber layer has at least one projection integrally formed on an outer peripheral surface thereof and being brought into contact with the damper mass member.

20. A vibration-damping device according to claim 1, wherein said damper mass member includes a housing member having a storage space whose inner surface functions as said rigid abutting portion and housing said independent member therein.

* * * * *